US011221972B1

(12) United States Patent
Raman et al.

(10) Patent No.: US 11,221,972 B1
(45) Date of Patent: Jan. 11, 2022

(54) METHODS AND SYSTEMS FOR INCREASING FAIRNESS FOR SMALL VS LARGE NVME IO COMMANDS

(71) Applicant: Pensando Systems Inc., Milpitas, CA (US)

(72) Inventors: Balakrishnan Raman, Fremont, CA (US); Chaitanya Huilgol, Bengaluru (IN); Harinadh Nagulapalli, San Jose, CA (US); Murty Subba Rama Chandra Kotha, San Jose, CA (US); Sanjay Shanbhogue, Santa Clara, CA (US); Varada Raja Kumar Kari, Bengaluru (IN); Vishwas Danivas, Santa Clara, CA (US)

(73) Assignee: Pensando Systems, Inc., Milpitas, CA (US)

( * ) Notice: Subject to any disclaimer, the term of this patent is extended or adjusted under 35 U.S.C. 154(b) by 0 days.

(21) Appl. No.: 17/066,285

(22) Filed: Oct. 8, 2020

Related U.S. Application Data

(60) Provisional application No. 63/082,417, filed on Sep. 23, 2020.

(51) Int. Cl.
   *G06F 13/28* (2006.01)
   *G06F 13/16* (2006.01)
   (Continued)

(52) U.S. Cl.
   CPC ........ *G06F 13/1642* (2013.01); *G06F 13/128* (2013.01); *H04L 49/205* (2013.01);
   (Continued)

(58) Field of Classification Search
   None
   See application file for complete search history.

(56) References Cited

U.S. PATENT DOCUMENTS

| 10,880,204 | B1 * | 12/2020 | Shalev | ................. H04L 69/22 |
| 2016/0162438 | A1 * | 6/2016 | Hussain | ............... G06F 3/0683 |
| | | | | 709/212 |

(Continued)

FOREIGN PATENT DOCUMENTS

WO WO-2017131724 A1 * 8/2017 ........... G06F 3/0617

OTHER PUBLICATIONS

Infiniband, "Annex A16: RDMA over Converged Ethernet (RoCE)", Supplement to InfiniBand Architecture Specification, vol. 1, Release 1.2.1, Apr. 6, 2010, 19 pgs.

(Continued)

*Primary Examiner* — Phyllis A Book
(74) *Attorney, Agent, or Firm* — Loza & Loza, LLP

(57) ABSTRACT

Increased fairness for small vs large NVMe IO commands for accessing a non-volatile memory namespace provided by a network attached storage appliance can be realized by placing NVMe submissions received by a NVMe SQ on a first fabric queue set or a second fabric queue set based on a fairness policy. The first fabric queue set accesses the namespace via a first fabric connection. The second fabric queue set accesses the namespace via a second fabric connection. Accessing the namespace via the fabric connections results in NVMe completions that are merged from the fabric queue sets onto an NVMe completion queue. A process producing the NVMe submissions and receiving the resulting NVMe completions may be unaware of the multiple fabric queue sets.

20 Claims, 17 Drawing Sheets

(51) Int. Cl.
  *G06F 13/12* (2006.01)
  *H04L 29/08* (2006.01)
  *H04L 29/12* (2006.01)
  *H04L 12/931* (2013.01)

(52) U.S. Cl.
  CPC ...... *H04L 61/6063* (2013.01); *H04L 67/1097* (2013.01); *H04L 69/322* (2013.01)

(56) References Cited

U.S. PATENT DOCUMENTS

| | | | |
|---|---|---|---|
| 2017/0024334 A1* | 1/2017 | Bergsten | G06F 13/4221 |
| 2018/0069923 A1* | 3/2018 | Tsalmon | G06F 15/17331 |
| 2018/0285024 A1* | 10/2018 | Coleman | G06F 9/4881 |
| 2019/0294373 A1* | 9/2019 | Lee | G06F 3/0679 |
| 2020/0065269 A1* | 2/2020 | Balasubramani | G06F 13/1668 |
| 2020/0293465 A1* | 9/2020 | Yang | G06F 3/0635 |
| 2021/0286745 A1* | 9/2021 | Smith | G06F 13/404 |

OTHER PUBLICATIONS

Infiniband, "Annex A17: RoCEv2", Supplement to InfiniBand, Architecture Specification, vol. 1, Release 1.2.1 Sep. 2, 2014, 23 pgs.
Infiniband, "InfiniBandTM Architecture Specification", vol. 1, Release 1.4, Apr. 7, 2020, 1981 pgs.
NVM Express, "NVM Express over Fabrics", Revision 1.1, Oct. 22, 2019, 83 pgs.
NVM Express, "Base Specification", NVM Express, Revision 1.4, Jun. 10, 2019, 403 pgs.
Chadalapaka, M. et al. "Internet Small Computer System Interface (iSCSI) Protocol (Consolidated)", https://tools.ietf.org/html/rfc7143, retrieved Jul. 31, 2020, 295 pgs.

* cited by examiner

700

PCIe Registers for NVMe Devices

| Start | End | Name | Type |
|---|---|---|---|
| 0 | 3Fh | PCI Header | |
| PMCAP | PMCAP+7h | PCI Power Management Capability | PCI Capability |
| MSICAP | MSICAP+9h | Message Signaled Interrupt Capability | PCI Capability |
| MSXICAP | MSIXCAP+Bh | MSI-X Capability | PCI Capability |
| PXCAP | PXCAP+29h | PCI Express Capability | PCI Capability |
| AERCAP | AERCAP+47h | Advanced Error Reporting Capability | PCI Express Extended Capability |

PCIe Header for NVMe Device

| | | | | |
|---|---|---|---|---|
| Device ID | | Vendor ID | | 00h |
| Status | | Command | | 04h |
| Class Code | | Revision ID | | 08h |
| BIST | Header Type | Latency Timer | Cache Line Size | 0Ch |
| BAR0 - Memory Register Base Address, lower 32-bits | | | | 10h |
| BAR1 - Memory Register Base Address, upper 32-bits | | | | 14h |
| BAR 2 – Index/Data Pair Register Base Address (I/O Space) or Vendor Specific | | | | 18h |
| BAR 3 (Vendor Specific) | | | | 1Ch |
| BAR 4 (Vendor Specific) | | | | 20h |
| BAR 5 (Vendor Specific) | | | | 24h |
| Cardbus CIS Pointer | | | | 28h |
| Subsystem ID | | Subsystem Vendor ID | | 2Ch |
| Expansion ROM Base Address | | | | 30h |
| Reserved | | Capabilities Pointer | | 34h |
| Reserved | | | | 38h |
| Max Lat. | Min Gnt. | Interrupt Pin | Interrupt Line | 3Ch |

FIG. 8

NVMe Device Registers
Located at PCI BAR0 and BAR1
(Note: All reserved properties and all reserved bits within properties are read-only and return 0h when read. )

| 31         24 23         16 15         8 7         0 | Offset |
|---|---|
| Controller Capabilities | 00h / 04h |
| Version | 08h |
| INTMS (Reserved) | 0Ch |
| INTMC (Reserved) | 10h |
| Controller Configuration (CC) | 14h |
| Reserved (Reserved) | 18h |
| Controller Status (CSTS) | 1Ch |
| NVM Subsystem Reset (Optional) (NSSR) | 20h |
| Admin Queue Attributes (AQA) (Reserved) | 24h |
| Admin Submission Queue Base Address (ASQ) (Reserved) | 28h / 2Ch |
| Admin Completion Queue Base Address (ACQ) (Reserved) | 30h / 34h |
| CMBLOC (Reserved) | 38h |
| CMBSZ (Reserved) | 3Ch |
| Reserved | ⋮ EFFh |
| Reserved - Command Set Specific (The property address range from 0h to FFFh is reserved for functionality that is equivalent to the register functionality defined for NVMe over PCIe.) | ⋮ FFFh |
| Reserved - Reserved for Fabrics definition (The property address range from 1000h to 12FFh is reserved for definition by NVMe over Fabrics.) | ⋮ 12FFh |

1000

Extended Capabilities Registers for NVME Single Root I/O Virtualization

| Next Capability Offset | Capability Version | PCI Express Extended Capability ID | 00h |
|---|---|---|---|
| SR-IOV Capabilities ||| 04h |
| SR-IOV Status || SR-IOV Control | 08h |
| TotalVFs (RO) || InitialVFs (RO) | 0Ch |
| RsvdP | Function Dependency Link (RO) | NumVFs (RW) | 10h |
| VF Stride (RO) || First VF Offset (RO) | 14h |
| VF Device ID (RO) || RsvdP | 18h |
| Supported Page Sizes (RO) ||| 1Ch |
| System Page Size (RW) ||| 20h |
| VF BAR0 (RW) ||| 24h |
| VF BAR1 (RW) ||| 28h |
| VF BAR2 (RW) ||| 2Ch |
| VF BAR3 (RW) ||| 30h |
| VF BAR4 (RW) ||| 34h |
| VF BAR5 (RW) ||| 38h |
| VF Migration State Array Offset (RO) ||| 3Ch |

FIG. 10

METHODS AND SYSTEMS FOR INCREASING FAIRNESS FOR SMALL VS LARGE NVME IO COMMANDS

TECHNICAL FIELD

The embodiments relate to computer networks, network appliances, network switches, network routers, P4 packet processing pipelines, programmable packet processing pipelines implemented using special purpose circuitry, PCIe (peripheral component interconnect express) cards, NVMe (non-volatile memory express) interfaces, and network attached storage.

BACKGROUND

Host computers and virtual machines (VMs) running on the host computers can access NAS (network attached storage) devices via a SAN (storage area network) by placing submissions on a SQ (submission queue) of a NVMe (non-volatile memory express) interface such as that of a PCIe (peripheral component interconnect express) card. The NVMe interface can process each submission by accessing the NAS in accordance with the submission, receiving a response from the NAS, and placing a completion on a CQ (completion queue) of the NVMe interface. The NVMe interface must typically be standards compliant in order to interoperate with the standards compliant NAS appliances produced by entities in the SAN industry. A standard for NVMe-oF (NVMe over fabric) is "NVM Express over Fabrics Revision 1.1" published by NVM Express, Inc. on Oct. 22, 2019. According to the standard, all the IO transactions on a single attachment between a NVMe interface and a SAN use the same SQ/CQ pair.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method. The method can include receiving, by a NVMe submission queue (Non-Volatile Memory Express submission queue), a plurality of NVMe commands for accessing a non-volatile memory namespace provided by a network attached storage appliance. The method can also include placing the plurality of NVMe commands received by the NVMe submission queue on a plurality of fabric queue sets including a first fabric queue set that accesses the non-volatile memory namespace via a first fabric connection and a second fabric queue set that accesses the non-volatile memory namespace via a second fabric connection, and merging a plurality of first NVMe completions from the first fabric queue set and a plurality of second NVMe completions from the second fabric queue set onto a NVMe completion queue configured to receive a plurality of NVMe completions indicating a plurality of results of the plurality of NVMe commands.

Another aspect of the subject matter described in this disclosure can be implemented in a host side storage interface. The host side storage interface can include a NVMe submission queue configured to receive a plurality of NVMe commands for accessing a non-volatile memory namespace provided by a network attached storage appliance, a NVMe completion queue configured to receive a plurality of NVMe completions indicating a plurality of results of the plurality of NVMe commands, and a plurality of fabric queue sets including a first fabric queue set that accesses the non-volatile memory namespace via a first fabric connection and a second fabric queue set that accesses the non-volatile memory namespace via a second fabric connection, wherein the host side storage interface is further configured to place the plurality of NVMe commands received by the NVMe submission queue on the plurality of fabric queue sets in accordance with a fairness policy, and to merge a plurality of first NVMe completions from the first fabric queue set and a plurality of second NVMe completions from the second fabric queue set onto the NVMe completion queue.

Yet another aspect of the subject matter described in this disclosure can be implemented by a host side storage interface. The host side storage interface can include a NVMe submission queue configured to receive a plurality of NVMe commands for accessing a non-volatile memory namespace provided by a means for providing remote storage, a NVMe completion queue configured to receive a plurality of NVMe completions associated with the plurality of NVMe commands, and a means for diverting a first NVMe command from the NVMe submission queue to a means for accessing the non-volatile memory namespace via a first connection means. The host side storage interface can also include a means for diverting a second NVMe command from the NVMe submission queue to a means for accessing the non-volatile memory namespace via a second connection means, a means for receiving a means for indicating a result of a first command, a means for receiving a means for indicating the result of a second command, and a means for merging the means for indicating the result of the first command and the means for indicating the result of the second command onto the NVMe completion queue.

In some implementations of the methods and devices, the first fabric queue set receives the plurality of NVMe commands that are below a size threshold and the second fabric queue set receives the plurality of NVMe commands that are above the size threshold. In some implementations of the methods and devices, a host provides a NVMe interface that includes the NVMe submission queue and the NVMe completion queue. In some implementations of the methods and devices, the first fabric connection connects to the network attached storage appliance and the second fabric connection connects to a second network attached storage appliance mirroring the non-volatile memory namespace.

In some implementations of the methods and devices, the first fabric connection is a first transmission control protocol (TCP) connection configured with a first quality of service, and the second fabric connection is a second TCP connection configured with a second quality of service different from the first quality of service. In some implementations of the methods and devices, a host includes a SR-IOV (single root IO virtualization) capable NVMe card that provides a VF (virtual function) that includes the NVMe submission queue and the NVMe completion queue. In some implementations of the methods and devices, the first fabric connection carries a plurality of NVMe/TCP PDUs to and from the network attached storage appliance.

In some implementations of the methods and devices, the first fabric connection carries a plurality of iSCSI packets to and from the network attached storage appliance. In some implementations of the methods and devices, the first fabric connection carries a plurality of Infiniband payloads to and from the network attached storage appliance. In some implementations of the methods and devices, the plurality of NVMe commands that are below a size threshold are diverted to the first fabric queue set and the plurality of NVMe commands that are above the size threshold are diverted to the second fabric queue set.

In some implementations of the methods and devices, the devices can also include a means for selecting a portion of the plurality of NVMe commands for diversion to the means for accessing the non-volatile memory namespace via the first connection means, and a means for selecting a second portion of the plurality of NVMe commands for diversion to the means for accessing the non-volatile memory namespace via the second connection means.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 7 is a memory map diagram illustrating a non-limiting example of PCIe registers for a NVMe (non-volatile memory extended) interface according to some aspects.

FIG. 8 is a memory map diagram illustrating a non-limiting example of a PCIe header for an NVMe device according to some aspects.

FIG. 9 illustrates a non-limiting example of NVMe device registers according to some aspects.

FIG. 10 illustrates a non-limiting example of extended capabilities registers for NVMe SR-IOV (single root input/output virtualization) according to some aspects.

Throughout the description, similar reference numbers may be used to identify similar elements.

DETAILED DESCRIPTION

Figure 1:
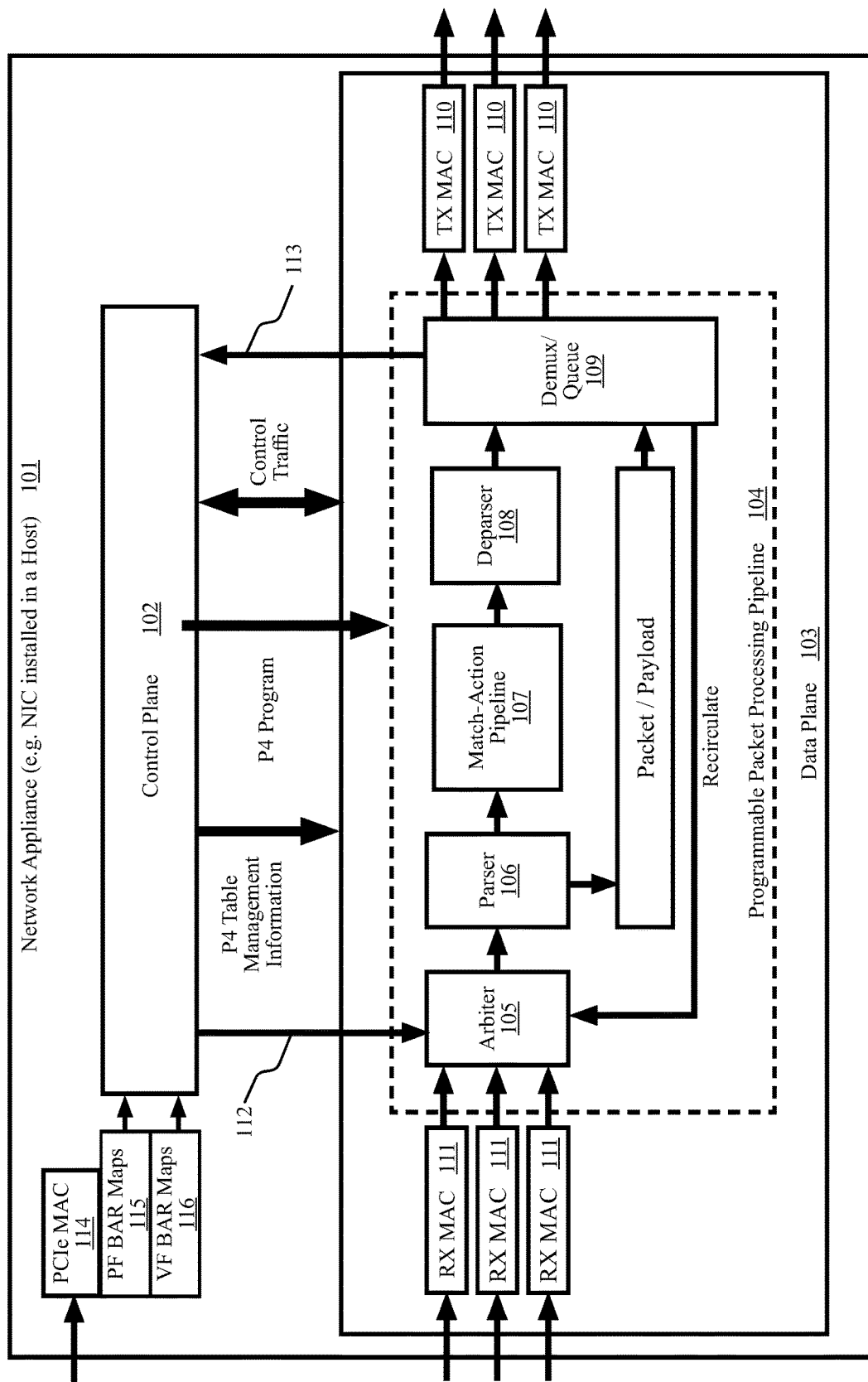
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Network interface cards (NICs), such as those described below, can have packet processing pipelines in their data planes. Such NICs can be configured to implement NVMe (non-volatile memory express) interfaces. Virtual machines (VMs) and processing running on the hosts can use the NICs for accessing NAS (network attached storage) devices via a SAN (storage area network). NVMe implementations in the NICs can require multiple pipeline passes and access to offload engines (encryption/decryption, digest, etc.). As such, large IO commands posted to a namespace served by the NAS can cause head of line blocking for small IO commands posted after the large ones. An ideal solution to the problem would be transparent to the host's processes, the VMs, etc.

One way to solve this problem is to queue large IO commands separately from small IO commands in different fabric queue sets such that differently sized commands use different fabric connections. The fabric connections can connect the NIC to different NAS devices that are mirroring the namespace. As such, small commands can be sent to one NAS device mirroring the namespace and large commands can be sent to a different NAS device mirroring the namespace. The head of line blocking problem is thereby relieved.

One of the advantages is that the solution is transparent to the processes and device drivers running on the host and VMs because the NIC implements the fabric queue sets internally. Other advantages include: the head of line blocking problem is relieved; small commands do not incur latency while large commands complete; and that the small commands and the large commands can be serviced in parallel by the different NAS devices mirroring the namespace.

The multiple fabric connections may require multiple rings to be maintained for pipeline passes and for the offload engines. The fabric connections may be TCP (transmission control protocol) connections. In order to separate the handling of TCP connections in the NIC and other network nodes, these TCP connections can be configured to have different classes of service via DSCP (differentiated services code point) header values COS (cost of service) tags. These service levels can be used to influence scheduling of queues in the network and in the target. The range of IO command sizes sent to each fabric queue set can be configured by a user depending on their deployment scenarios. If needed, there can also be default configuration which will be effective in the absence of user configuration.

In the field of data networking, the functionality of network appliances such as switches, routers, and network interface cards (NICs) is often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows, which include I/O traffic flows with a NAS, extremely quickly if the match-action pipeline is configured to process those traffic flows. Upon receiving a packet of a network traffic flow or NVMe submission/completion, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match action pipeline is not yet configured to process. If there is no match, then the match-action pipeline can perform a default action.

FIG. 1 is a functional block diagram of a network appliance having a control plane and a data plane and in which aspects may be implemented. A network appliance 101, such as a NIC, can have a control plane 102 and a data plane. The control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. In some embodiments, the control plane may implement operations related to packet routing that include NVM Express (NVMe) controller management functions, Open Shortest Path First (OSPF), Enhanced Interior Gateway Routing Protocol (EI-GRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). In some embodiments, the data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing. Although FPGAs are able to provide a high level of flexibility for data plane processing, FPGAs are relatively expensive to produce and consume much more power than ASICs on a per-packet basis.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "P4$_{16}$ Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MAC 104 implements media access control on incoming packets via, for example, a MAC protocol such as Ethernet. In an embodiment, the MAC protocol is Ethernet and the RX MAC is configured to implement operations related to, for example, receiving frames, half-duplex retransmission and backoff functions, Frame Check Sequence (FCS), interframe gap enforcement, discarding malformed frames, and removing the preamble, Start Frame Delimiter (SFD), and padding from a packet. Likewise, the TX MAC 108 implements media access control on outgoing packets via, for example, Ethernet. In an embodiment, the TX MAC is configured to implement operations related to, for example, transmitting frames, half-duplex retransmission and backoff functions, appending an FCS, interframe gap enforcement, and prepending a preamble, an SFD, and padding.

As illustrated in FIG. 1, a P4 program is provided to the data plane via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane and the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. In an embodiment, the information extracted from a packet by the parser is referred to as a packet header vector or "PHV." In an embodiment, the parser identifies certain fields of the header and extracts the data corresponding to the identified fields to generate the PHV. In an embodiment, the PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, NVME-oF packets, iSCSI packets, etc.) as determined by the match-action pipeline. In some cases, a packet payload may travel in a separate queue or buffer, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 305 for additional processing.

A NIC 101 can have a PCIe (peripheral component interconnect extended) interface such as PCIe MAC (media access control) 114. A PCIe MAC can have a BAR (base address register) at a base address in a host system's memory space. Processes, typically device drivers within the host systems operating system, can communicate with the NIC via a set of registers beginning with the BAR. Some PCIe devices are SR-IOV (single root input output virtualization) capable. Such PCIe devices can have a PF (physical function) and multiple virtual functions (VFs). A PF BAR map 115 can be used by the host machine to communicate with the PCIe card. A VF BAR map 116 can be used by a VM running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an NVMe controller via another PF. As such, the NIC can provide "NIC" VFs and "NVMe" VFs to VMs running on the host. The NVMe PF and VFs can be used to access remote non-volatile storage on SAN (storage area network) storage devices.

Figure 2:
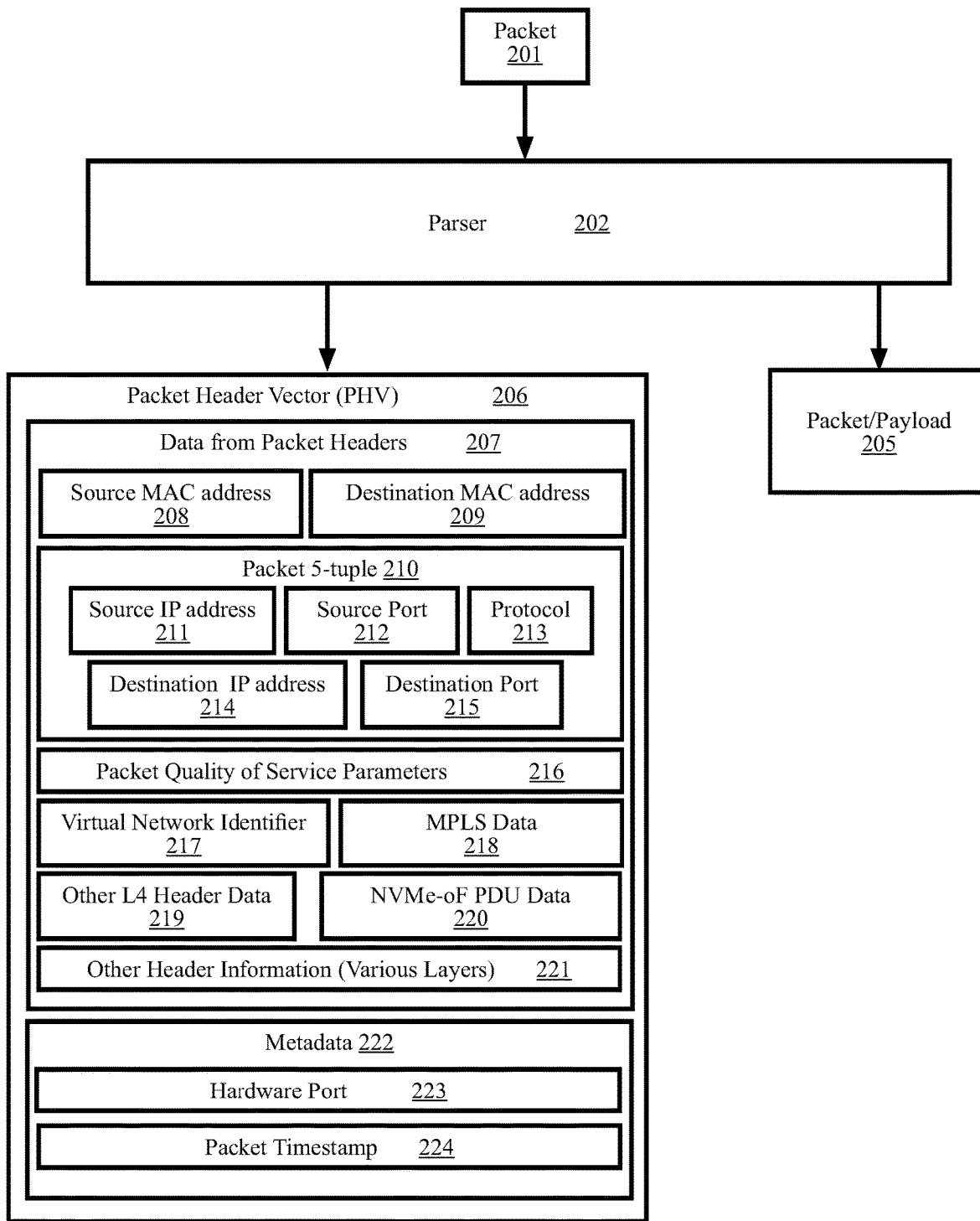
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamp 224 indicating when the packet 201 was received by the network appliance.

The source MAC address 208 and the destination MAC address 209 can be obtained from the packet's layer 2 header. The source IP address 211 can be obtained from the packets layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packets layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. The NVMe-oF (NVMe over fiber) PDU (protocol data unit) data 220 can be obtained from the packet's layer 7 header and layer 7 payload. The other header information 221 is the other information contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Those practiced in SAN (storage area network) protocols such as NVMe-oF, iSCSI (internet small computer systems interface), and Infiniband realize that the data packets communicated by SANs also have well defined and standardized formats. As such, SAN packets and packet headers can be easily created and processed by a programmable data plane such as the data plane of a P4 programmable NIC. Specifically, the parser can parse SAN packets, the match-action pipeline can process SAN packets, the deparser can assemble SAN packet headers, the demux/queue can assemble SAN packets, and the network appliance or NIC can send and receive SAN packets.

A NIC can receive packets via a PCIe interface in accordance with the PCIe specifications. The control plane can process the PCIe packets or the data plane can process the PCIe packets if properly configured to do so by the control plane. For example, the NIC can act as an NVMe controller that receives NVMe submissions from the host and that provides NVMe completions to the host. The data formats of NVMe submissions and completions are defined by the NVMe specifications. As such, the data plane can be configured by the control plane via P4 programming to process NVMe submissions from a VM running on the host to thereby produce NVMe-oF (or iSCSI, etc.) packets that are sent to a SAN storage device. The results from the SAN storage device can be processed by the data plane to produce NVMe completions that are provided to the VM. This example showcases the programmability of a P4 programmable NIC in that PCIe packets carrying NVMe submissions can be processed to send packets to a SAN device using any of the well documented SAN protocols and the results from the SAN device can be processed to produce NVMe completions. Here, the NIC is transparently translating between base protocols.

Figure 3:
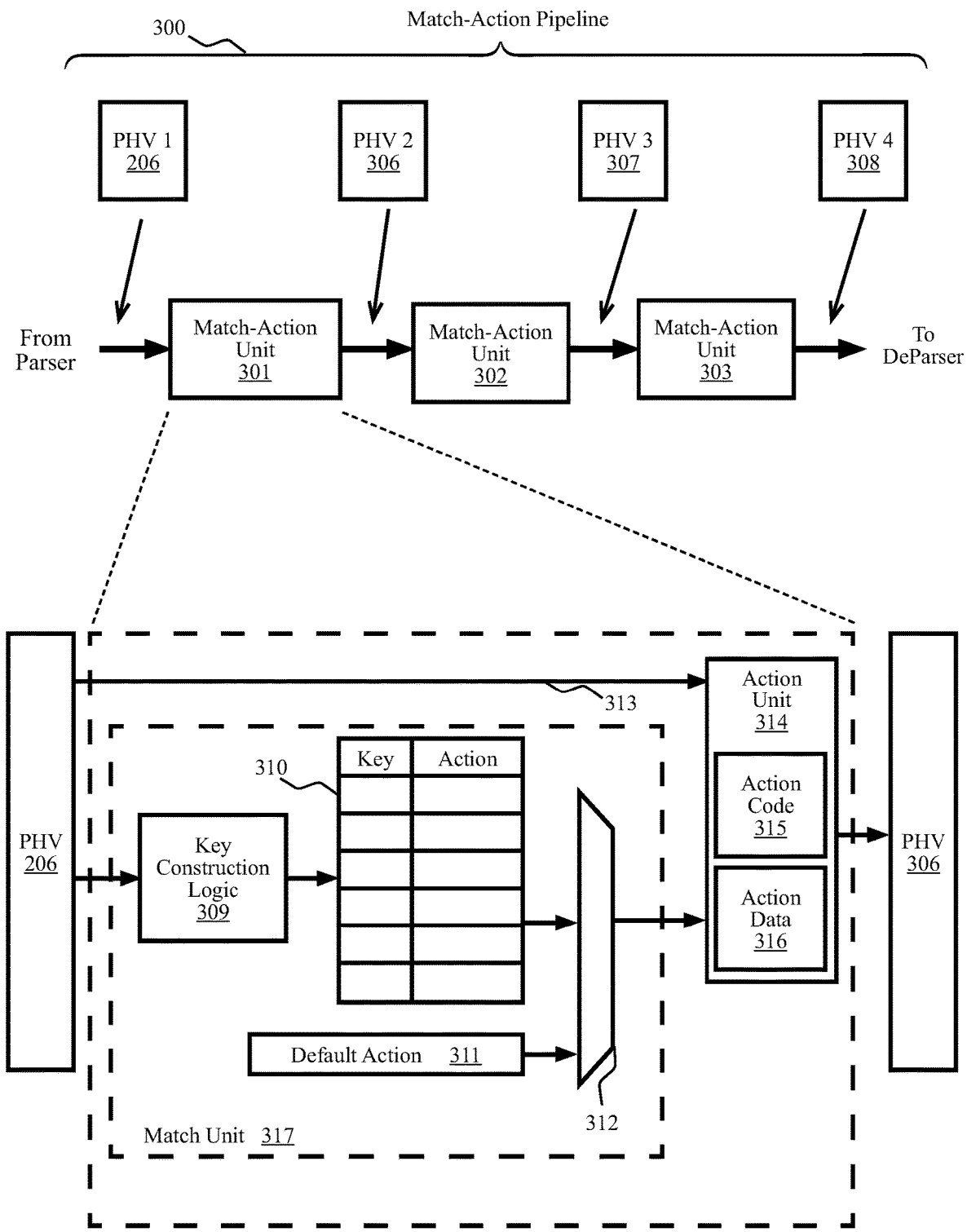
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units 301, 302, 303 of the match-action pipeline 300 are programmed to perform "match-action" operations in which a match unit performs a lookup using at least a portion of the PHV and an action unit performs an action based on an output from the match unit. In an embodiment, a PHV generated at the parser is passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 206 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 206 and an action unit 314 that produces an output PHV 306, which may be a modified version of the input PHV 206. The match unit 317 can include key construction logic 309, a lookup table 310, and selector logic 312. The key construction logic 309 is configured to generate a key from at least one field in the PHV. The lookup table 310 is populated with key-action pairs, where a key-action pair can include a key (e.g., a lookup key) and corresponding action code 315 and/or action data 316. In an embodiment, a P4 lookup table generalizes traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. In an embodiment, operations of the match-action unit are programmable in the control plane via P4 and the contents of the lookup table is managed by the control plane.

Figure 4:
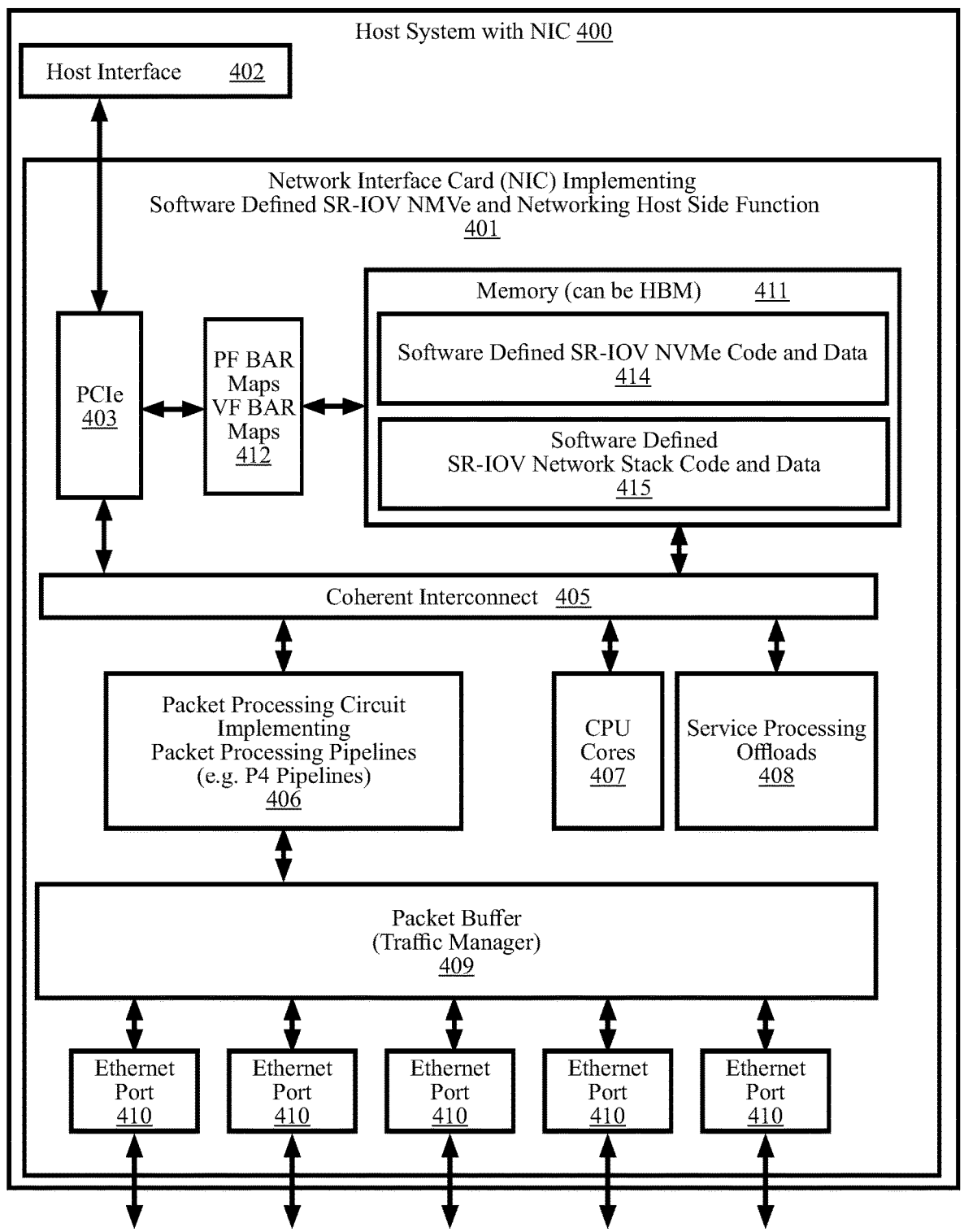
FIG. 4 is a high-level diagram of a network interface card (NIC) configured as a network appliance according to some aspects.

FIG. 4 is a high-level diagram of a network interface card (NIC) 401 configured as a network appliance according to some aspects. Aspects of the embodiments, including packet processing pipelines, fast data paths, and slow data paths, can be implemented in the NIC 401. The NIC 401 can be configured for operation within a host system 400. The host system can be a general-purpose computer with a host interface 402 such as a PCIe interface. The NIC 401 can have a PCIe interface 403 through which it can communicate with the host system 400. The NIC can also include a memory 411, a coherent interconnect 405, a packet processing circuit implementing a packet processing pipeline (e.g. P4 pipelines) 406, CPU cores 407, service processing offloads 408, packet buffer 409, and ethernet ports 410.

As discussed above, the P4 pipelines are configured for programming via a P4 domain-specific language for programming the data plane of network appliances that is currently defined in the "P4$_{16}$ Language Specification," version 1.2.0, as published by the P4 Language Consortium on Oct. 23, 2019. As such, the P4 pipeline's inputs, outputs, and operations may be constrained such that the P4 pipeline operates in accordance with the P4 language specification.

The NIC 401 can include a memory 411 for running Linux or some other operating system, for storing large data structures such as flow tables and other analytics, and for providing buffering resources for advanced features including TCP termination and proxy, deep packet inspection, storage offloads, and connected FPGA functions. The memory system may comprise a high bandwidth module (HBM) module which may support 4 GB capacity, 8 GB capacity, or some other capacity depending on package and HBM. The HBM may be required for accessing full packets at wire speed. Wire speed refers to the speed at which packets can move through a communications network. For example, each of the ethernet ports can be a 100 Gbps port. Wire speed for the network appliance may therefore be operation at 100 Gbps for each port. HBMs operating at over 1 Tb/s are currently available.

In an embodiment, the CPU cores 407 are general purpose processor cores, such as ARM processor cores, MIPS (Microprocessor without Interlocked Pipeline Stages) processor cores, and/or x86 processor cores, as is known in the field. In an embodiment, each CPU core includes a memory interface, an ALU, a register bank, an instruction fetch unit, and an instruction decoder, which are configured to execute instructions independently of the other CPU cores. In an embodiment, the CPU cores are Reduced Instruction Set Computers (RISC) CPU cores that are programmable using a general-purpose programming language such as C.

In an embodiment, each CPU core 407 also includes a bus interface, internal memory, and a memory management unit (MMU) and/or memory protection unit. For example, the CPU cores may include internal cache, e.g., L1 cache and/or L2 cache, and/or may have access to nearby L2 and/or L3 cache. In an embodiment, each CPU core includes core-specific L1 cache, including instruction-cache and data-cache and L2 cache that is specific to each CPU core or shared amongst a small number of CPU cores. L3 cache may also be available to the CPU cores.

In an embodiment there are multiple CPU cores 407 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The service processing offloads 408 are specialized hardware modules purposely optimized to handle specific tasks at wire speed, such as cryptographic functions, compression/decompression, etc.

The packet buffer 409 can act as a central on-chip packet switch that delivers packets from the network interfaces 410 to packet processing elements of the data plane and vice-versa. The packet processing elements can include a slow data path implemented in software and a fast data path implemented by packet processing circuitry 406.

The packet processing circuit implementing packet processing pipelines 406 can be a specialized circuit or part of a specialized circuit using one or more ASICs or FPGAs to implement a programmable packet processing pipeline such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 407 and memory 404 are configured via software to implement a slow data path. A network appliance having two data paths has a fast data path and a slow data path when one of the data paths process packets faster than the other data path.

All memory transactions in the NIC 401, including host memory, on board memory, and registers may be connected via a coherent interconnect 405. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing circuit implementing packet processing pipelines 406, CPU cores 407, and PCIe interface 403. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches. The NOC cache may be used to aggregate memory write transactions which may be smaller than the cache line (e.g., size of 64 bytes) of an HBM.

The memory can contain data and executable code such as software defined SR-IOV network stack code and data 415. The PF BAR maps and VF BAR maps 412 can map PCIe register locations to specific locations with the NIC's memory 411. As such, the host and VMs can write to PCIe "registers" that are actually specified memory locations within the NIC's memory 411. The software defined SR-IOV network stack code is executable code that can be executed by the CPU cores to thereby implement NIC functionality. As such, the NIC PF and the NIC VF's are simply chunks of memory 411 that are read and written by software defined SR-IOV network stack code as executable code. The PF's and VF's can therefore be termed "software defined" because the NIC can instantiate different numbers of PFs and VFs by allocated different amounts of memory 411 as PCIe registers. The NIC 401 can therefore implement one or more NIC PFs and an arbitrary number of NIC VFs.

The memory can contain data and executable code such as software defined SR-IOV NVMe code and data. Here, the executable code implements software defined NVMe controllers. The NIC 401 can implement one or more NVMe controller PFs and an arbitrary number of NVMe controller VFs. Interestingly, the software defined NVMe controllers may use the software defined NICs to access remote storage via a SAN.

Above, it was contemplated that the CPU cores execute the software defined SR-IOV network stack code and the software defined SR-IOV NVMe code. In practice, the packet processing pipeline 406 can be configured to process I/O commands received via the PCIe interface. For example, the packet processing pipeline 406 can be configured to access the "registers" in memory 411 and thereby process I/O commands therein. In another example, the CPUs can store the I/O commands as packets within the packet buffer such that the packet processing pipeline 406 process the commands as it would process other packets received via any other interface or port.

Figure 5:
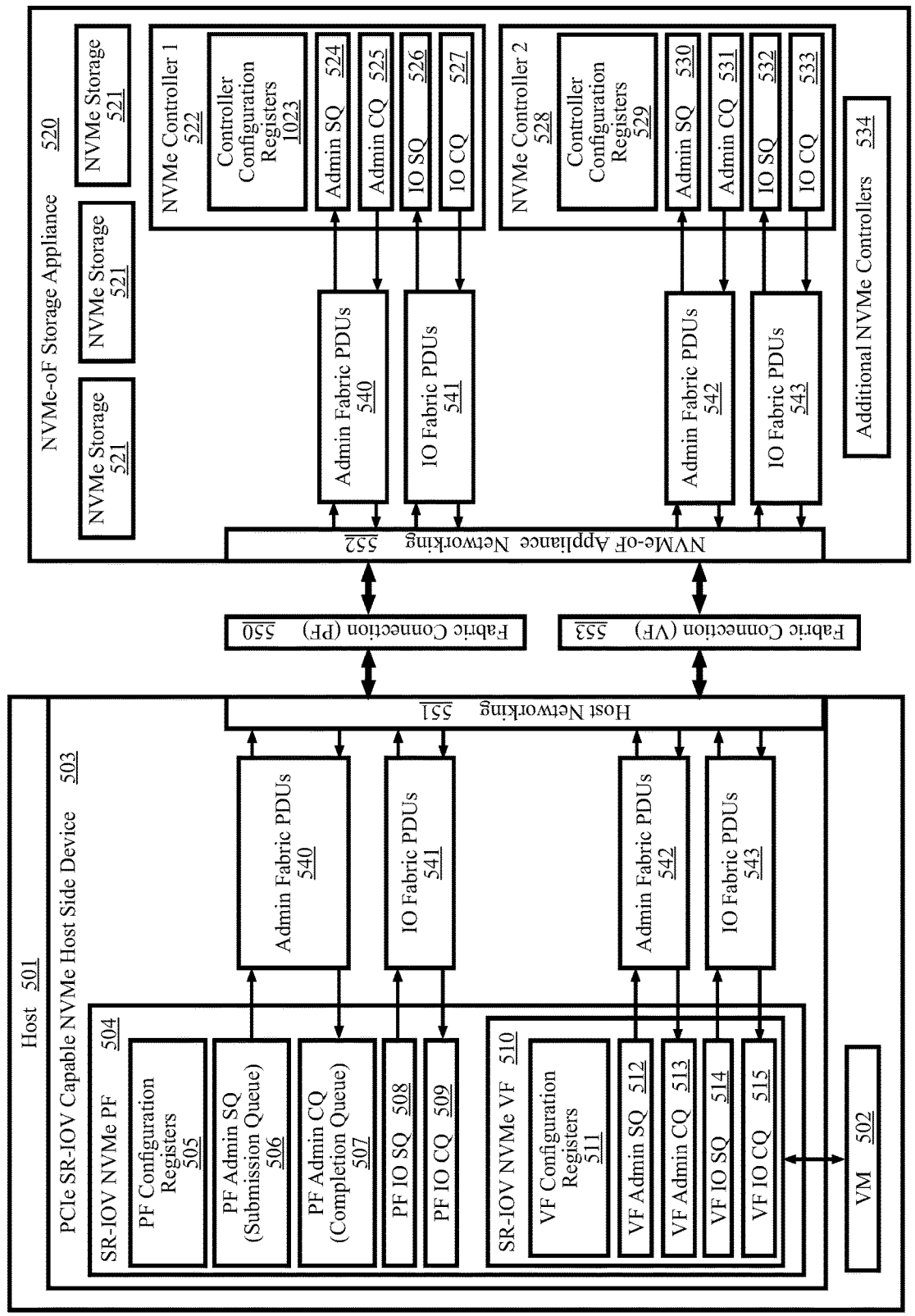
FIG. 5 is a high-level block diagram of a non-limiting example of a VM (virtual machine) running in a host computer and accessing a NAS (network attached storage) via a SR-IOV (single root input/output virtualization) PCIe (peripheral component interconnect extended) card according to some aspects.

FIG. 5 is a high-level block diagram of a non-limiting example of a VM 502 (virtual machine) running in a host computer 501 and accessing a NAS 520 (network attached storage) via a SR-IOV (single root input/output virtualization) PCIe (peripheral component interconnect extended) card 503 according to some aspects. The example of FIG. 5 is provided to introduce some of the base concepts and aspects of NVMe interface, NVMe controllers, and SANs. The PCIe SR-IOV capable NVMe host side device 503 can be a NIC as described above and, for brevity, will here be called a NIC. The NIC 503 can provide a PF 504 and one or more VFs 510. The PF 504 is a SR-IOV NVMe PF 504 and the VF 510 is a SR-IOV NVMe VF 510. The SR-IOV NVMe PF 504 can have PF configuration registers 505, a PF admin SQ (submission queue) 506, a PF admin CQ (completion queue) 507, a PF 10 SQ 508, and a PF 10 CQ 509. The SR-IOV NVMe VF 510 can have VF configuration registers 511, a VF admin SQ 512, a VPF admin CQ 513, a VF IO SQ 514, and a VF IO CQ 515.

The NVMe host side device 503 can provide access to a NAS via a SAN. In FIG. 5, the NAS is a NVMe-oF storage appliance 520 having NVMe storage 521 that can be accessed via NVMe controller 1 522, NVMe controller 2 528, and additional NVMe controllers 534. NVMe controller 1 522 can have controller configuration registers 523, an admin SQ 524, an admin CQ 525, an IO SQ 56, and an IO CQ 527. NVMe controller 2 528 can have controller configuration registers 529, an admin SQ 530, an admin CQ 531, an IO SQ 532, and an IO CQ 533. The controller configuration registers 523, 529 can be set up and maintained by the NAS 520.

A NVMe SQ is a submission queue that can accept submissions from a host machine or VM. The submissions can be requests to attach to a particular NVMe namespace, to store data, or to return data. A NVMe CQ is a completion queue that can receive the results of the submissions. For example, a submission that requests storage of data can have a completion that confirms successful storage of the data. The admin queues can be used for administrative requests such as attachment to a controller, getting or setting features, getting log pages, setting up IO queues, etc. The IO queues can service submissions for storing data into non-volatile storage or for returning data stored in non-volatile storage. Some implementations have no admin queues because the administrative transactions are handled via IO queues.

FIG. 5 has a SAN wherein PDUs (protocol data units) are carried between host networking 551 and NVMe-oF appliance networking 552 via fabric connections 550, 553. The PF fabric connection 550 can carry the PF's admin fabric PDUs 540 and IO fabric PDUs 541 between the host 501 and the NVMe-oF appliance networking 552. The VF fabric connection 553 can carry the VF's admin fabric PDUs 542 and IO fabric PDUs 543 between the host 501 and the NVMe-oF appliance networking 552.

The host 501 can place an administrative NVMe submission on PF admin SQ 506. The NIC can translate the NVMe submission into an admin fabric PDU 540 that is sent to the NAS 520 where it is translated to an NVMe submission that is placed onto admin SQ 524. NVMe controller 1 523 services the submission resulting in a NVMe completion that is translated into an admin fabric PDU 540, returned to the host 501 via the SAN, and translated into a NVMe completion that is placed in PF admin CQ 507. The host 501 can then process the completion.

The host 501 can place an IO submission on PF IO SQ 508. The NIC can translate the submission into an IO fabric PDU 541 that is sent to the NAS 520 where it is translated to a submission that is placed onto IO SQ 526. NVMe controller 1 523 services the submission resulting in a completion that is translated into an IO fabric PDU 541, returned to the host 501 via the SAN, and translated into a completion that is placed in PF IO CQ 509. The host 501 can then process the completion.

The VM 502 can place an administrative submission on VF admin SQ 512. The NIC can translate the submission into an admin fabric PDU 542 that is sent to the NAS 520 where it is translated to a submission that is placed onto admin SQ 530. NVMe controller 2 528 services the submission resulting in a completion that is translated into an admin fabric PDU 542, returned to the host 501 via the SAN, and translated into a completion that is placed in VF admin CQ 513. The VM 502 can then process the completion.

The VM 502 can place an IO submission on VF IO SQ 514. The NIC can translate the submission into an IO fabric PDU 543 that is sent to the NAS 520 where it is translated to a submission that is placed onto IO SQ 532. NVMe controller 2 528 services the submission resulting in a completion that is translated into an IO fabric PDU 543, returned to the host 501 via the SAN, and translated into a completion that is placed in VF IO CQ 515. The VM 502 can then process the completion.

The specific protocol of the fabric PDUs 540, 541, 542, 543 can be any of the SAN protocols such as NVMe/TCP, NVMe/RoCE v1, NVMe/RoCE v2, or iSCSI. A NIC, such as a NIC with a programmable packet processing pipeline can easily translate between NVMe submissions/completions and any of the SAN protocols.

Figure 6:
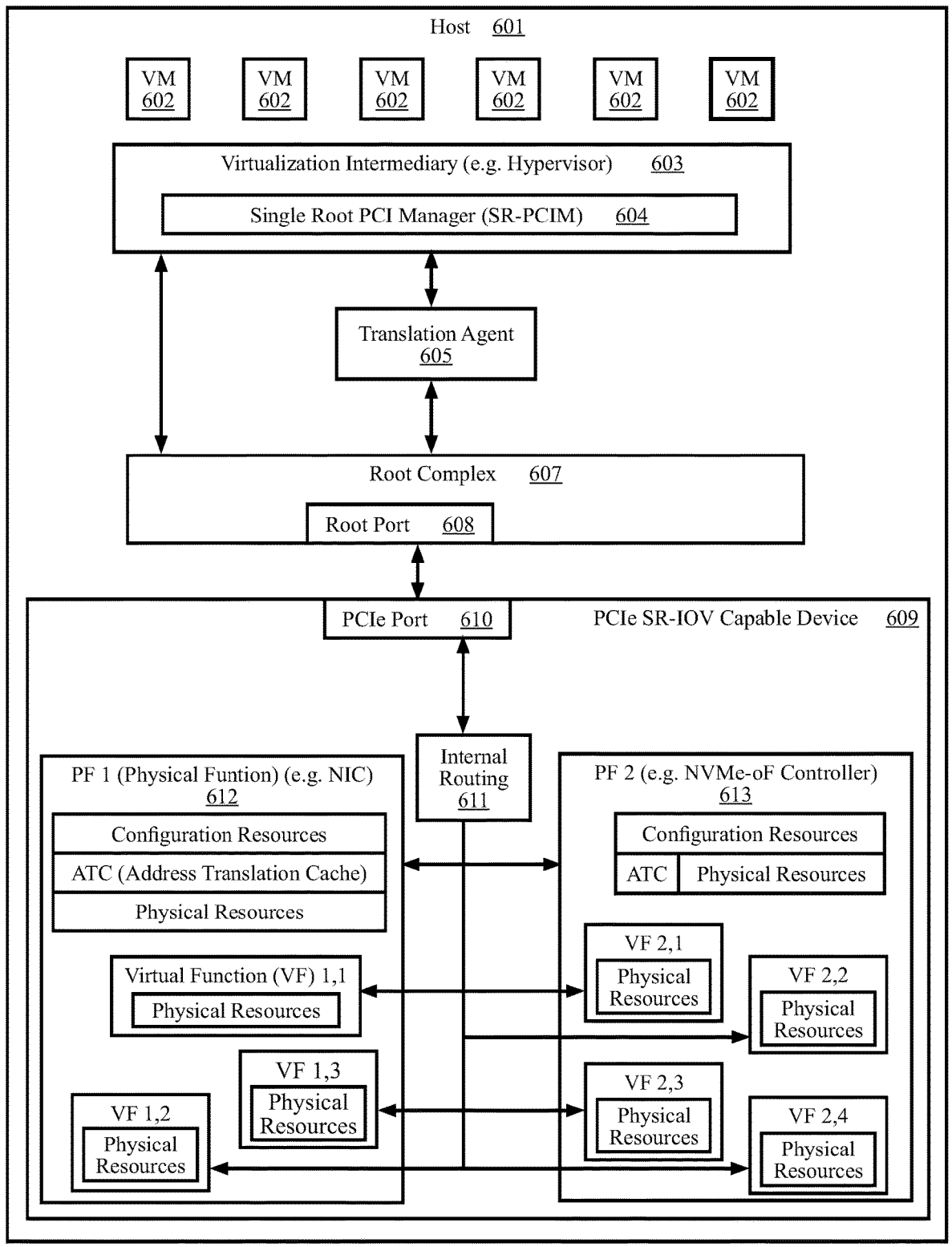
FIG. 6 is a high-level block diagram of VMs running on a host computer and accessing VFs (virtual functions) implemented by a PCIe SR-IOV capable device according to some aspects.

FIG. 6 is a high-level block diagram of VMs 602 running on a host computer 601 and accessing VFs (virtual functions) implemented by a PCIe SR-IOV capable device 609 according to some aspects. The PCI-SIG (peripheral component interconnect special interest group) is an electronic industry consortium that specifies the PCI and PCIe computer buses as well as the PCI SR-IOV specification. An interesting aspect of PCIe is that, even though it is called a computer bus, it is actually carrying packetized data between the computer's CPU (often via the "northbridge") and peripheral devices such as NICs, graphics cards, and non-volatile storage controllers.

Host 601 can run numerous VMs 602 under the control of a virtualization intermediary 603 such as a hypervisor. The virtualization intermediary 603 can communicate with a root complex 607 which, here, can simply be considered to be the host's PCI interface. The host 601 can communicate with a PCIe device via a root port 608 of the root complex and the PCIe port 610 of the PCIe device. The PCIe SR-IOV capable device 609 can be a PCIe card installed in the host computer 601. In accordance with the PCIe SR-IOV specifications, a SR-PCIM (single root PCI manager) can manage associations between the VMs and the VFs on the PCIe-SR-IOV capable PCIe device 609. Also, in accordance with the specifications, a translation agent 605 can translate memory space or IO space addresses referenced by the host 601 or VMs 602 into the addresses used by the PFs and VFs in the PCIe SR-IOV capable device 609.

The PCIe SR-IOV capable device 609 can act as both a NIC and a NVMe controller. As such, PF 1 612 of PCIe card 609 can be a NIC while PF 2 613 can be a NVMe controller. Each PF can have configuration resources (e.g. device registers), ATC (address translation cache), and physical resources. The address translation caches can speed data transactions between PCIe devices by caching address lookups. The physical resources are the components that implement the PFs and VFs. PF 1 is illustrated as having three VFs. PF 2, is illustrated as having four VFs. All the VFs are shown having some physical resources. For software defined VFs, those physical resources may simply be chunks of memory used as registers, queues, device storage, etc.

FIGS. 7-10 show standardized register locations and register contents for a SR-IOV capable NVMe-oF PCIe card. The locations and contents are provided to show that that configuration information and data associated with each PF and each VF are available at locations that are specified by published standards and that the data at those locations is also in accordance with published standards. In particular, each PF and VF has a PCIe state as indicated by PCIe resources such as PCIe header location and contents and device registers. Each PF also has a PF state and each VF has a VF state. The PF and VF states include configuration information and data such as IO buffers, queues, device state, connections (for NICS), attachments (for NVMe interfaces), etc.

FIG. 7 is a memory map diagram illustrating a non-limiting example of PCIe register locations for a NVMe interface 700 according to some aspects. The memory map of FIG. 7 is that provided in revision 1.4 of the NVM Express Specification. The NVM Express is an open collection of standards developed and maintained by a consortium originally called the NVM Express Work Group that is now incorporated as NVM Express, Inc. The PCIe registers locations are relative to a base address. As such, the PCI header is located at the base address. The PCIe header has a specific size and format in accordance with the PCIe specification.

FIG. 8 is a memory map diagram illustrating a non-limiting example of a PCIe header for an NVMe device 800 according to some aspects. FIG. 7 provided a map of register locations whereas FIG. 8 details register contents for an NVMe device. The NVMe PCIe header of FIG. 8 is that provided in revision 1.4 of the NVM Express Specification. Note that the PCIe header for the NVMe device can be for local storage or remote storage. BAR0 and BAR1 can combine to form a 64-bit memory address at which the NVMe device registers are located.

FIG. 9 illustrates a non-limiting example of NVMe device registers 900 according to some aspects. The illustrated NVMe device registers are those specified by "NVM Express over Fabrics, Revision 1.1" published by NVM Express, Inc. on Oct. 22, 2019.

FIG. 10 illustrates a non-limiting example of extended capabilities registers for NVMe SR-IOV 1000 (single root input/output virtualization) according to some aspects. The illustrated PCIe registers are those specified by "Single Root I/O Virtualization and Sharing Specification Revision 1.1" published by PCI-SIG on Jan. 20, 2010. As can be seen, a base address for the VFs are provided within these particular PCIe extended capabilities registers. In many aspects, the PFs but none of the VFs have such a set of SR-IOV registers.

FIGS. 11A-11H illustrate packet headers and payloads of packets for network traffic flows 1100 and NAS (network attached storage) access according to some aspects. A network traffic flow 1100 can have numerous packets such as a first packet 1122, a second packet 1123, a third packet 1124, a fourth packet 1125, and a final packet 1126 with many more packets between the fourth packet 1125 and the final packet 1126. The term "the packet" or "a packet" can refer to any of the packets in a network traffic flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 1101 and layer 2 payload 1102. The layer 2 header can contain a source MAC address 1103, a destination MAC address 1104, and other layer 2 header data 1105. The input ports 111 and output ports 110 of a network appliance 101 can have MAC addresses. In some embodiments a network appliance 101 has a MAC address that is applied to all or some of the ports. In some embodiments one or more of the ports each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3 is a layer 2 protocol. IEEE 802.11 (WiFi) is another widely used layer 2 protocol. The layer 2 payload 1102 can include a Layer 3 packet.

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 1106 and a layer 3 payload 1107. The layer 3 header 1106 can have a source IP address 1108, a destination IP address 1109, a protocol indicator 1110, and other layer 3 header data 1111. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 1103 indicating the first node, a destination MAC address 1104 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 1103 indicating the intermediate node, a destination MAC address 1104 indicating the second node, and the IP packet as a payload. The layer 3 payload 1107 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 1106 using protocol indicator 1110. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 1107 includes a TCP header and a TCP payload. UDP can provide for computer applications to send messages, in this case referred to as datagrams, to other hosts on an IP network using a connectionless model. When carrying UDP data, a layer 3 payload 1107 includes a UDP header and a UDP payload. ICMP is used by network devices, including routers, to send error messages and operational information indicating success or failure when communicating with another IP address. ICMP uses a connectionless model.

A layer 4 packet can have a layer 4 header 1112 and a layer 4 payload 1113. The layer 4 header 1112 can include a source port 1114, destination port 1115, layer 4 flags 1116, and other layer 4 header data 1117. The source port and the destination port can be integer values used by host computers to deliver packets to application programs configured to listen to and send on those ports. The layer 4 flags 1116 can indicate a status of or action for a network traffic flow. For example, TCP has the RST, FIN, and ACK flags. RST indicates a TCP connection is to be immediately shut down and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A traffic flow can be terminated by a flow termination dialog. Examples of flow termination dialogs include: a TCP RST packet (with or without an ACK); and a TCP FIN packet flowed by a TCP ACK packet responsive to the TCP FIN packet. Other protocols also have well known flow termination dialogs. A layer 4 payload 1113 can contain a layer 7 packet.

The application layer, often called layer 7, includes the protocols used by most applications for providing user services or exchanging application data over the network connections established by the lower level protocols. Examples of application layer protocols include the Hypertext Transfer Protocol (HTTP), the File Transfer Protocol (FTP), the Simple Mail Transfer Protocol (SMTP), the Dynamic Host Configuration Protocol (DHCP), and the NVMe/TCP protocol. Data coded according to application layer protocols can be encapsulated into transport layer protocol units (such as TCP or UDP messages), which in turn use lower layer protocols to effect actual data transfer.

A layer 7 packet may be a NVMe/TCP PDU 1118 having a NVMe/TCP PDU header 1119 and a NVMe/TCP PDU payload 1120. NVMe/TCP is one of the common SAN protocols and can be used to implement NVMe-oF transactions between hosts and NAS appliances.

Figure 11A:
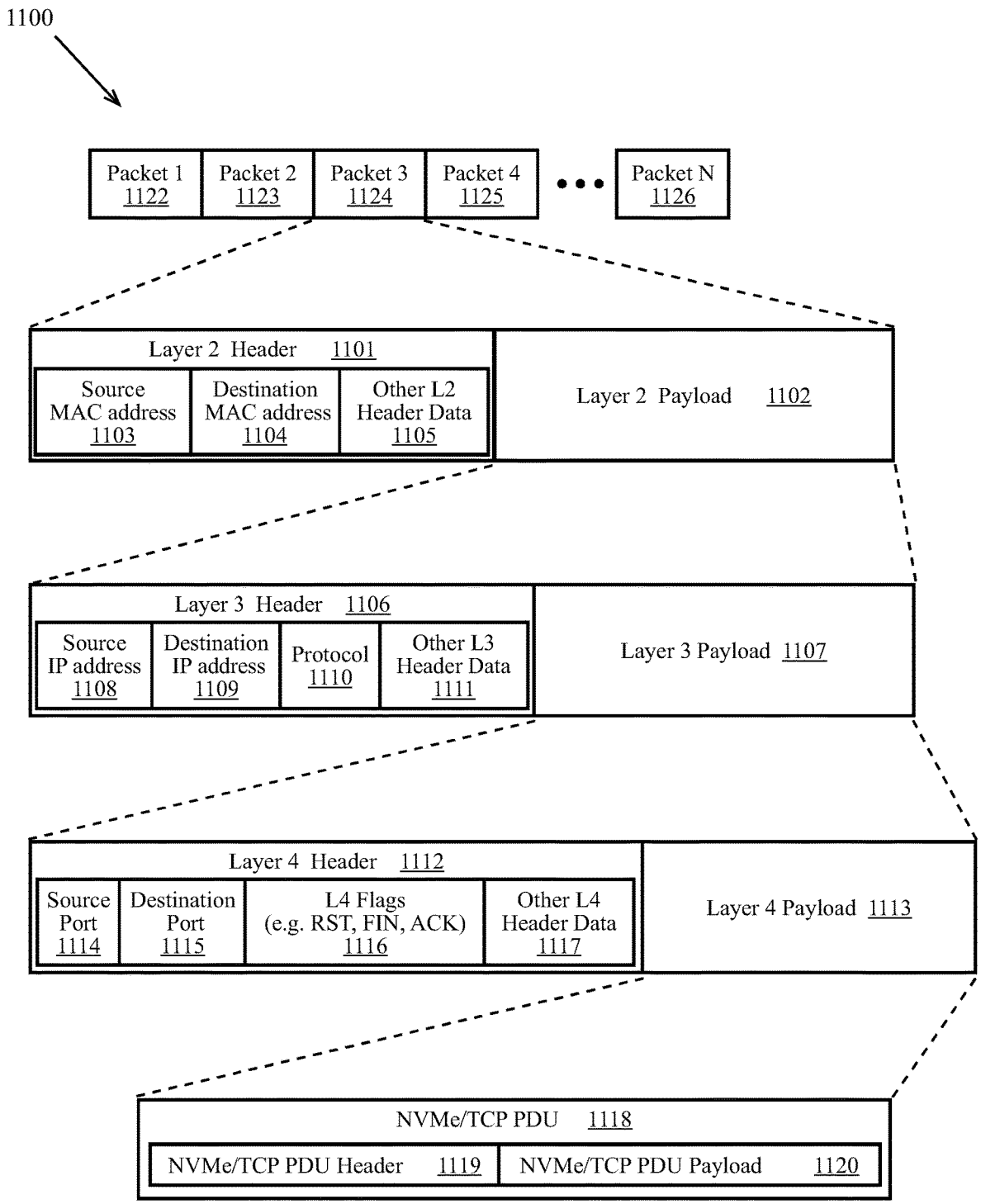
FIGS. 11A-11H illustrate packet headers and payloads of packets for network traffic flows and NAS (network attached storage) access according to some aspects.
Figure 11B:
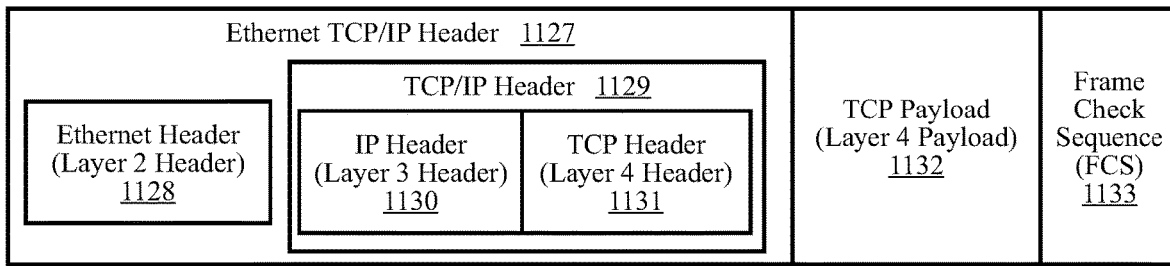
Figure 11C:
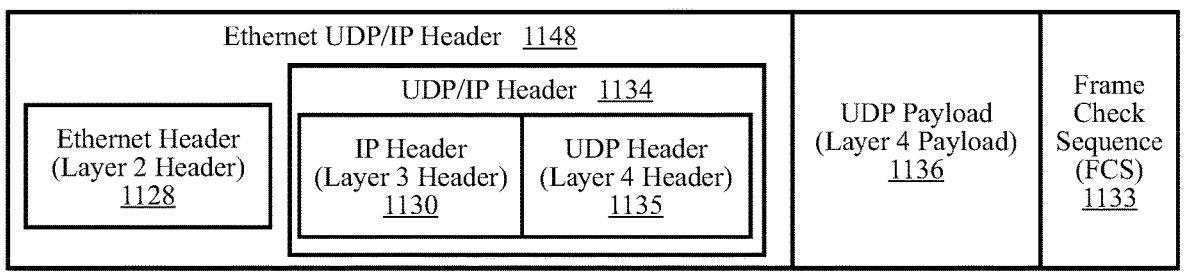

FIGS. 11B and 11C illustrate TCP/IP and UDP/IP Ethernet packets. Ethernet packets, such as TCP/IP and UDP/IP Ethernet packets, have an Ethernet header 1128 and a frame check sequence (FCS) 1133. As discussed above, Ethernet is a layer 2 protocol. An Ethernet TCP/IP header 1127 has an Ethernet header 1128 and a TCP/IP header 1129. The TCP/IP header 1129 has an IP header 1130 and a TCP header 1131. The Ethernet TCP/IP packet has a TCP payload 1132 as the layer 4 payload. An Ethernet UDP/IP packet differs from an Ethernet TCP/IP packet by having UDP as the layer 4 protocol. The Ethernet UDP/IP header 1148 has an Ethernet header 1128 and a UDP/IP header 1134. The UDP/IP header 1134 has an IP header 1130 and a UDP header 1135. The Ethernet UDP/IP packet has a UDP payload 1136 as the layer 4 payload.

NVMe is a communications protocol that has been used between host controllers and non-volatile storage devices. NVMe was originally designed for carrying commands and data between storage controllers and non-volatile storage devices attached to the same PCIe bus. NVMe over Fabric (NVMe-oF) is a technology that adapts NVMe for connecting storage controllers and non-volatile storage devices connected over a network. Implementations of NVMe-oF include NVMe/TCP, NVMe/RoCE. (RDMA (remote direct memory access) over Converged Ethernet), and NVMe over Fibre Channel. There are currently two versions of NVMe/RoCE, NVMe/RoCE v1 and NVMe/RoCE v2. NVMe-oF is defined in "NVM Express over Fabrics," version 1.1, as published by NVM Express, Inc. on Oct. 22, 2019. RoCE is defined in "Supplement to InfiniBand Architecture Specification Volume 1 Release 1.2.1, Annex 16 RDMA over Converged Ethernet (RoCE)" as published by the Infiniband Trade Association on Apr. 6, 2010. RoCE v2 is defined in "Supplement to InfiniB and Architecture Specification Volume 1 Release 1.2.1, Annex 17 RoCEv2" as published by the Infiniband Trade Association on Sep. 2, 2014.

Figure 11D:
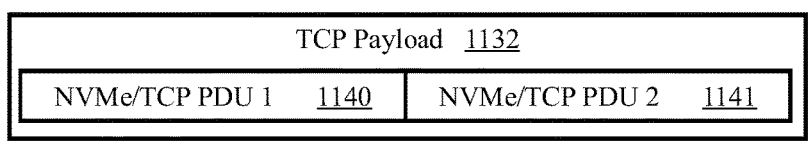
Figure 11E:
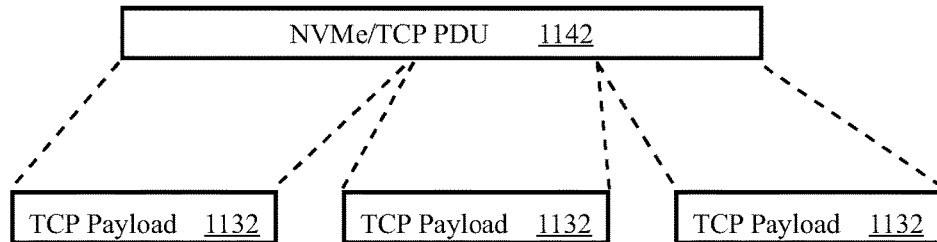

FIGS. 11D-11E illustrate the TCP payloads 1132 of NVME/TCP packets. FIG. 11D illustrates a single TCP/IP payload 1132 having multiple NVMe/TCP PDUs, NVMe/TCP PDU 1 1140 and NVMe/TCP PDU 2 1141. FIG. 11E illustrates multiple TCP payloads 1132 of multiple TCP packets carrying a single NVMe/TCP PDU 1142.

Figure 11F:
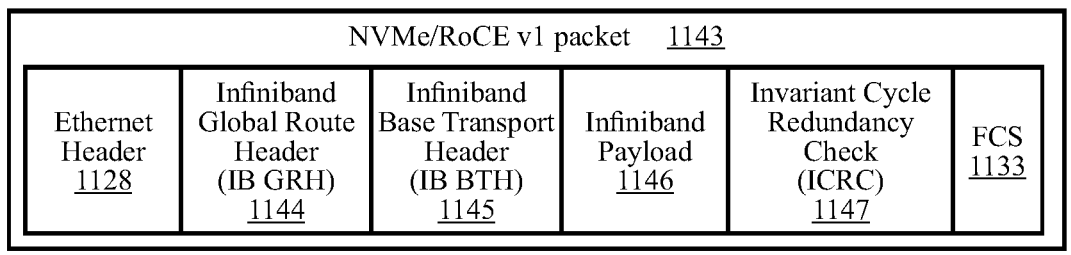

FIG. 11F illustrates a NVMe/RoCE v1 packet 1143. The NVMe/RoCE v1 packet 1143 can be seen to be an ethernet packet having an Ethernet payload that includes an Infiniband Global Route Header (IB GRH) 1144, an Infiniband Base Transport Header (IB BTH) 1145, an Infiniband payload 1146, and an Invariant Cyclic Redundancy Check (ICRC) 1147 field.

Figure 11G:
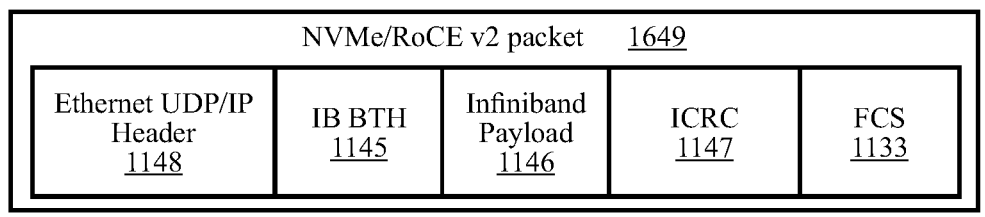

FIG. 11G illustrates a NVMe/RoCE v2 packet 1149. The NVMe/RoCE v2 packet 1149 can be seen to be an Ethernet UDP/IP packet having a UDP payload that includes the IB BTH 1145, the Infiniband payload 1146, and the ICRC 1147. Here, Ethernet is the layer 2 transport for a UDP packet carrying the Infiniband elements. Other layer 2 protocols may be used as the layer 2 transport.

Figure 11H:
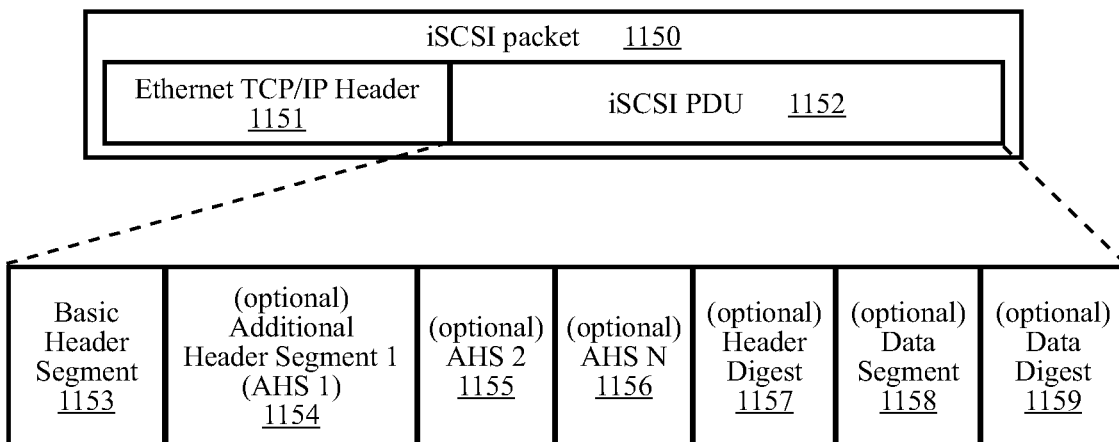

FIG. 11H illustrates an iSCSI packet 1150 having an Ethernet TCP/IP header 1151 and an iSCSI PDU 1152. The IETF (Internet Engineer Task Force) is a consortium that develops and publishes standards for the Internet in the form of RFCs (requests for comment). The iSCSI packet format is specified in IETF RFC 7143 titled "Internet Small Computer System Interface (iSCSI) Protocol", published in April, 2014. The iSCSI PDU 1152 can contain a basic header segment 1153, a first AHS (additional header segment) 1154, a second AHS 1155, an Nth AHS 1156, a header digest 1157, a data segment 1158, and a data digest 1159.

Figure 12:
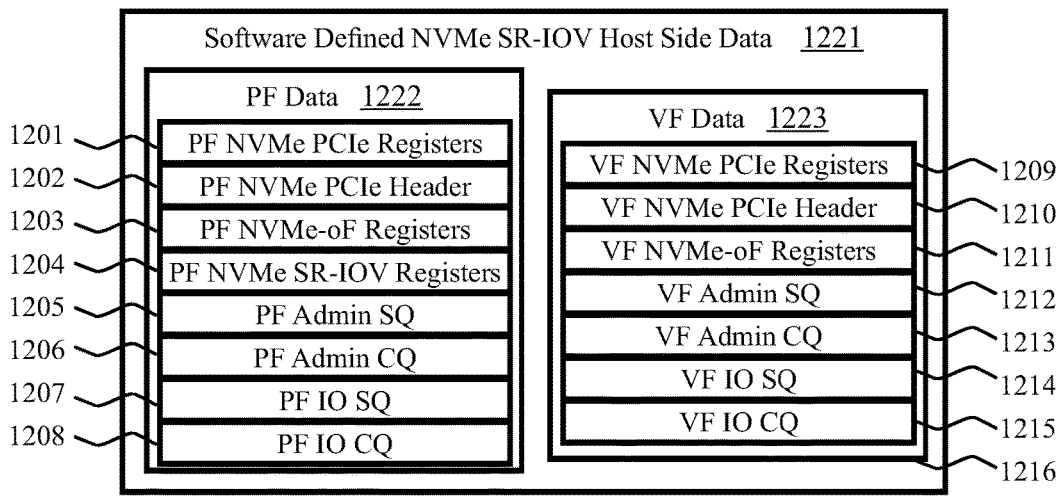
FIG. 12 is a high-level block diagram of a non-limiting example of software defined NVMe SR-IOV host side data according to some aspects.

FIG. 12 is a high-level block diagram of a non-limiting example of software defined NVMe SR-IOV host side data 1221 according to some aspects. The NVMe SR-IOV host side data 1221 can include PF data 1222 and VF data 1223. The PF data can contain PF NVMe PCIe registers 1201, a PF NVMe PCIe header 1202, PF NVMe-oF registers 1203, PF NVMe SR-IOV registers 1204, a PF admin SQ 1205, a PF admin CQ 1206, a PF IO SQ 1207, and a PF IO CQ 1208. The PF data can contain VF NVMe PCIe registers 1209, a VF NVMe PCIe header 1210, VF NVMe-oF registers 1211, a VF admin SQ 1212, a VF admin CQ 1213, a VF IO SQ 1214, and a VF IO CQ 1215.

Figure 13:
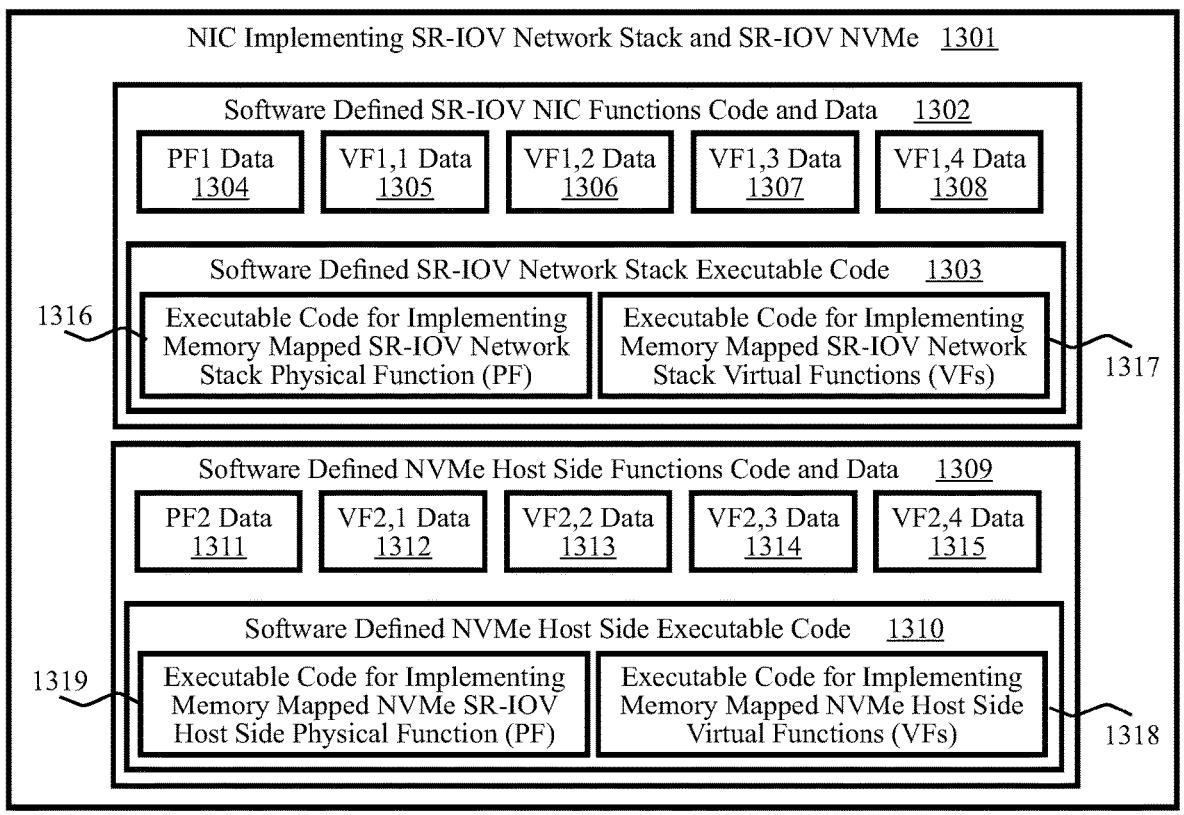
FIG. 13 is a high-level block diagram of a non-limiting example of a NIC (network Interface card) implementing a SR-IOV network stack and SR-IOV NVMe according to some aspects.

FIG. 13 is a high-level block diagram of a non-limiting example of a NIC 1301 implementing a SR-IOV network stack and SR-IOV NVMe according to some aspects. As discussed above, a SR-IOV capable NIC having PF BAR mapping, VF BAR mapping, on board memory, and a configurable packet processing pipeline can be configured to implement a software defined NIC and a software defined NVMe interface. The NIC can contain software defined SR-IOV NIC functions code and data 1302 and software defined NVMe host side functions code and data 1309.

The software defined SR-IOV NIC functions code and data 1302 can contain software defined SR-IOV network stack executable code 1303. Network stack executable code can be executed by the NIC to process packets such as those of FIG. 11A-11H including reading, writing, rewriting, forwarding, and processing the packets. The code can include executable code for implementing a memory mapped SR-IOV network stack physical function (NIC PF) 1316 and executable code for implementing a memory mapped SR-IOV network stack virtual functions (NIC VFs) 1317. The NIC PF is the PCIe card's first physical function, PF1. PF1 can have VFs such as VF1,1, VF1,2, VF1,3, and VF1,4. Implementing a software defined NIC PF includes maintaining PF1 data 1304. Implementing the VFs includes maintaining VF1,1 data 1305, VF1,2 data 1306, VF1,3 data 1307, and VF1,4 data 1308.

The software defined NVMe host side functions code and data 1309 can contain software defined NVMe host side executable code 1310. NVMe host side executable code can be executed by the NIC to process NVMe submissions and NVMe completions from the host and to access storage on a NAS via a SAN. The code can include executable code for implementing a memory mapped NVMe SR-IOV host side physical function (NVMe PF) 1319 and executable code for implementing a memory mapped NVMe SR-IOV host side virtual functions (NVMe VFs) 1318. The NVMe PF is the PCIe card's second physical function, PF2. PF2 can have VFs such as VF2,1, VF2,2, VF2,3, and VF2,4. Implementing a software defined NVMe PF includes maintaining PF2 data 1311. Implementing the VFs includes maintaining VF2,1 data 1312, VF2,2 data 1313, VF2,3 data 1314, and VF2,4 data 1315.

Figure 14:
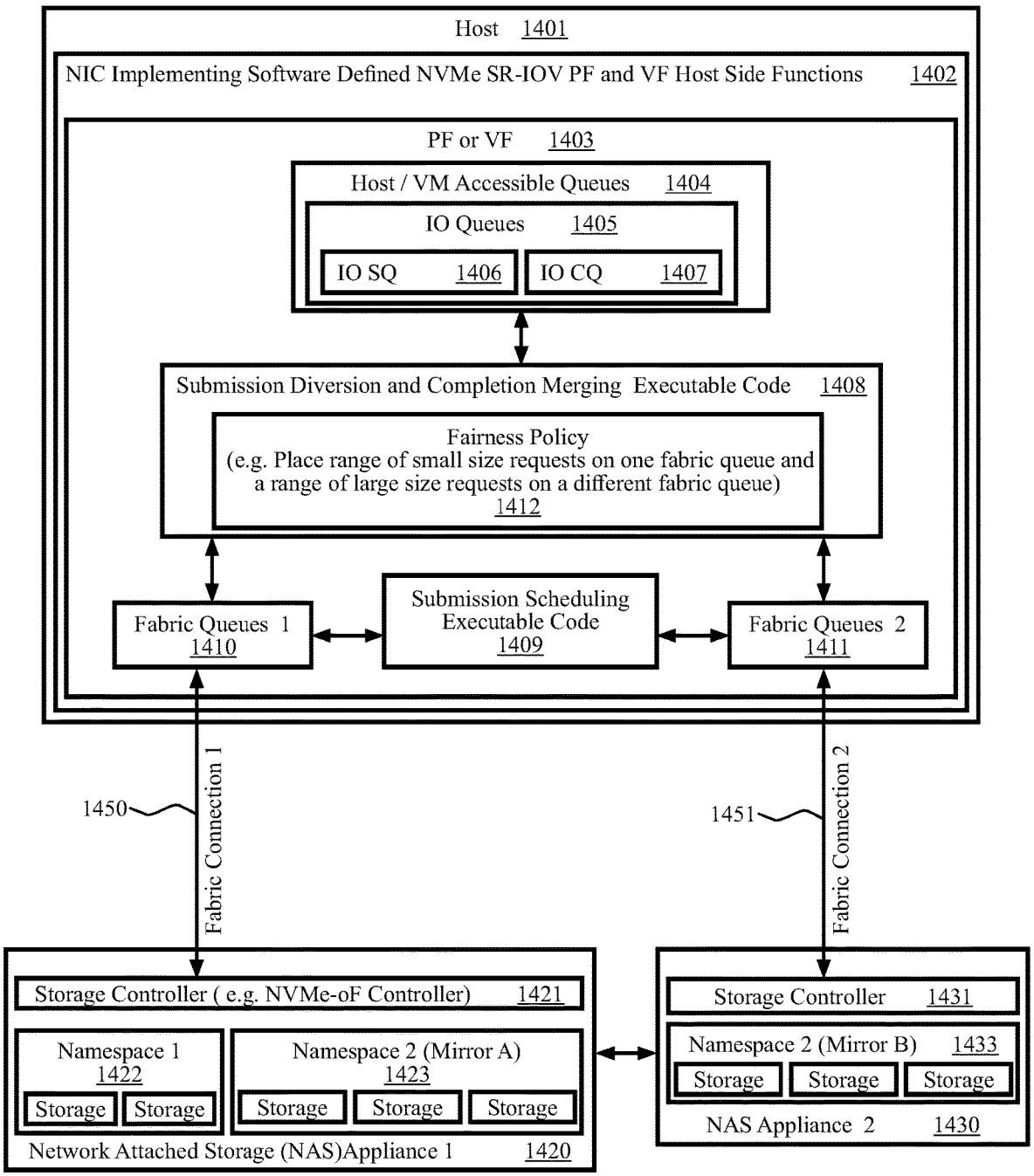
FIG. 14 illustrates a non-limiting example of a PF or a VF using two fabric queue sets and a fairness policy according to some aspects.

FIG. 14 illustrates a non-limiting example of a PF or a VF 1403 using two fabric queue sets 1410, 1411 and a fairness policy 1412 according to some aspects. The fabric queue sets 1410, 1411 and fairness policy 1412 are implemented by a NIC implementing software defined NVMe SR-IOV PF and VF host side functions 1402, The NIC 1402 is installed in a host computer 1401. For brevity, the following discussion will consider the host 1401 interacting with a PF 1403 having host accessible NVMe queues 1404. It is understood that the discussion applies equally to a VM interacting with a VF 1403 having VM accessible queues 1404. The NVMe queues 1404 can include IO queues 1405 which include an IO SQ 1406 and an IO CQ 1407. The NIC 1402 can include submission diversion and completion merging executable code 1408, a first fabric queue set 1410, a second fabric queue set 1411, and submission scheduling executable code 1409. An NVMe command (sometimes called an NVMe submission) can be placed on the IO SQ 1406 by the host. The submission diversion and completion merging executable code 1408 can examine the command and, based on a fairness policy, place the command on a first fabric queue set or a second fabric queue set. According to some aspects, a fabric queue set includes an SQ and a CQ. In other aspects, the fabric queue sets correspond to IO queues implemented in accordance with a SAN protocol such as iSCSI, Infiniband, or another SAN protocol.

A non-limiting example of a fairness policy is a fairness policy that places commands on fabric queue sets based on command size. The command size can be based at least in part on the number of bytes of data that are to be written to the namespace or read from the namespace. When two fabric queue sets are implemented for a PF, the policy can be to place a range of small size requests (those below a threshold) on the first fabric queue set 1410 and a range of large size requests (those above the threshold) on the second fabric queue 1411.

The NIC 1402 can access namespaces on a first NAS appliance 1420 and a second NAS Appliance 1430. The first NAS appliance 1420 is shown having a storage controller 1421 serving namespace 1 1422 and mirror A of namespace 2 1423. The second NAS appliance 1430 is shown having a storage controller 1431 serving mirror B of namespace 2 1433. Here, the NAS appliances are mirroring namespace 2. The submission scheduling executable code 1409 can manage the communication of commands on the fabric queue sets to the first NAS appliance 1420 via a first fabric connection 1450 and to the second NAS appliance 1430 via a second fabric connection 1451.

Figure 15:
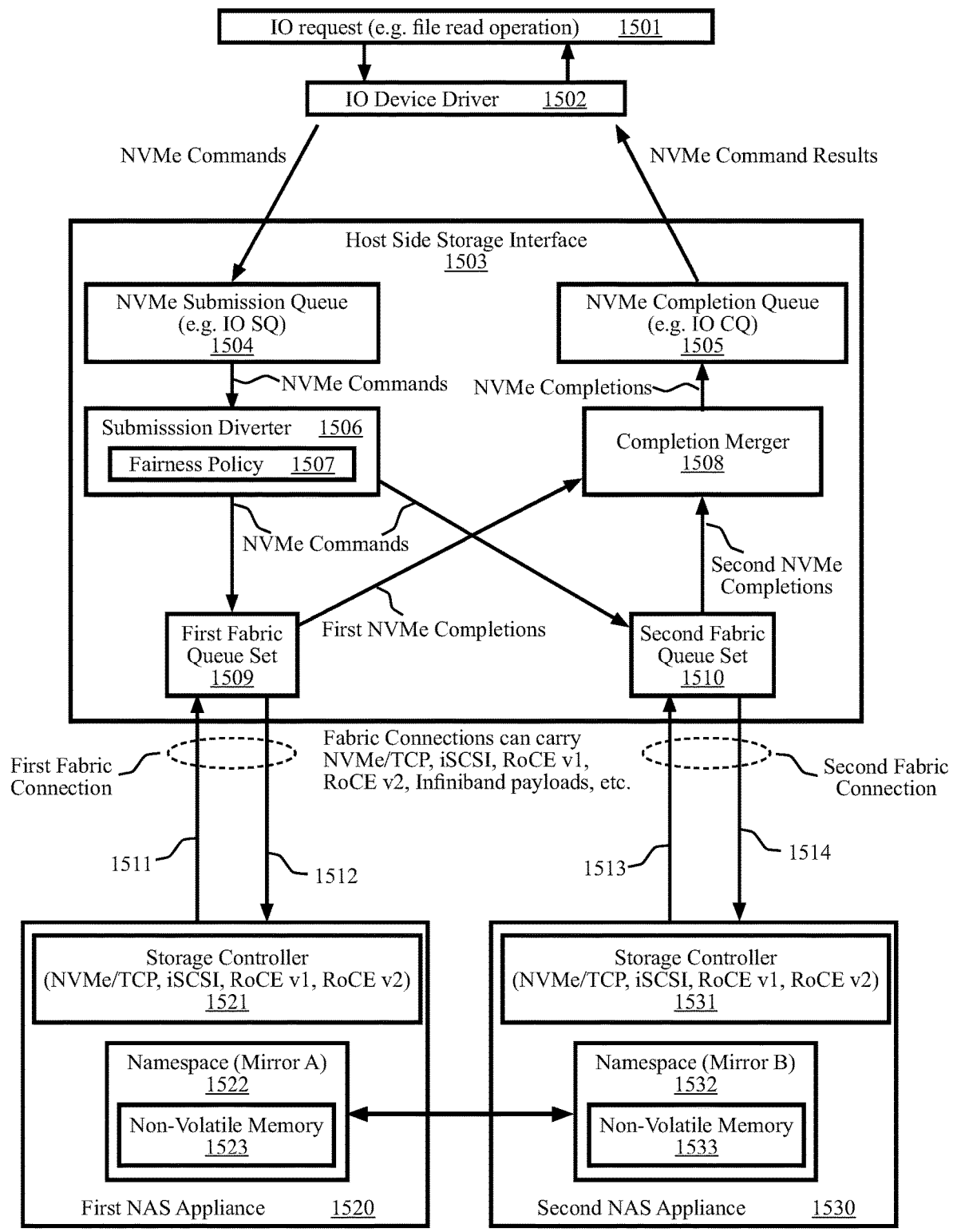
FIG. 15 is a high-level conceptual diagram of NVMe transactions being sent to different NAS appliances based on a fairness policy according to some aspects.

FIG. 15 is a high-level conceptual diagram of NVMe transactions being sent to different NAS appliances 1520, 1530 based on a fairness policy according to some aspects.

A host computer running a process can service IO requests via a host side storage interface 1503 such as the NIC discussed above. The process issues an IO request 1501, such as a file read operation for a specified number of bytes, to an IO device driver 1502. In response, the IO device driver 1502 can place a NVMe command on an NVMe SQ. A submission diverter 1506 can examine the NVMe command and place it on a first fabric queue set 1509 or a second fabric queue set 1510 in accordance with a fairness policy 1507. For example, a size-based policy can indicate that the command be placed on the first fabric queue set 1509 when the specified number of bytes is below a size threshold and that the command be placed on the second fabric queue set 1510 when the specified number of bytes is below a size threshold. The submission diverter 1506 can be implemented by a NIC implementing software defined NVMe SR-IOV PF and VF host side functions 1402 having submission diversion and completion merging executable code 1408.

A command placed on the first fabric queue set 1509 is sent 1512 to a first NAS appliance 1520. The first NAS appliance 1520 responds 1511 to the request and the response (sometimes called a completion) is placed back in in the first fabric queue set 1509. A command placed on the second fabric queue set 1510 is sent 1514 to a second NAS appliance 1530. The second NAS appliance 1530 responds 1513 to the request and the response is placed back in in the second fabric queue set 1510. A completion merger 1508 can monitor the fabric queue sets for IO responses and merge those responses onto an NVMe completion queue 1505. The completion merger 1508 can be implemented by a NIC implementing software defined NVMe SR-IOV PF and VF host side functions 1402 having submission diversion and completion merging executable code 1408. The IO device driver 1502 can process the NVMe completions on the NVMe CQ 1505 and thereby return the result of the IO request 1501.

The first NAS appliance 1520 is illustrated as having a storage controller 1521 that can use at least one of the common SAN protocols such as NVMe/TCP, iSCSI, RoCE v1, RoCE v2. The first NAS appliance 1520 is illustrated as maintaining mirror A of a namespace 1522 in a non-volatile memory 1523. The namespace is a non-volatile memory namespace that can accessed by accessing mirror A of a namespace 1522 in a non-volatile memory 1523. As such, the first NAS appliance 1520 can provide a host computer with access to the non-volatile memory namespace via a SAN. The second NAS appliance 1530 is illustrated as having a storage controller 1531 that can use at least one of the common SAN protocols such as NVMe/TCP, iSCSI, RoCE v1, RoCE v2. The second NAS appliance 1530 is illustrated as maintaining mirror B of the namespace 1532 in a non-volatile memory 1533. As such, the second NAS appliance 1530 can provide a host computer with access to the non-volatile memory namespace via a SAN. The NAS appliances 1520, 1530 are mirroring the namespace. As such, each NAS stores a substantially identical copy of the namespace. Mirroring is commonly used to protect against hardware failure and increase the number of IO requests to the namespace that can be concurrently handled.

An NVMe command can be placed on a fabric queue set as an IO command having any of the SAN protocols. The specific SAN protocol can be any SAN protocol carried by a particular fabric connection and understood by the NAS device connected to via the fabric connection. For example, the first NAS appliance can be configured to communicate using the NVMe/TCP protocol. NVMe commands placed on the first fabric queue set 1509 would therefore remain NVMe commands. The second NAS appliance 1530 can be configured to communicate using the iSCSI protocol. As such, NVMe commands placed on the second fabric queue set 1510 would be translated into iSCSI commands. As such, two NAS appliances serving the same namespace may be communicated with using different SAN protocols. Alternatively, the NVMe commands can be placed on the fabric queue sets as NVMe commands and later translated to the appropriate SAN protocol for transmission to a NAS. In such an alternative, the command response may be translated into a NVMe completion before being placed on the fabric queue set.

Figure 16:
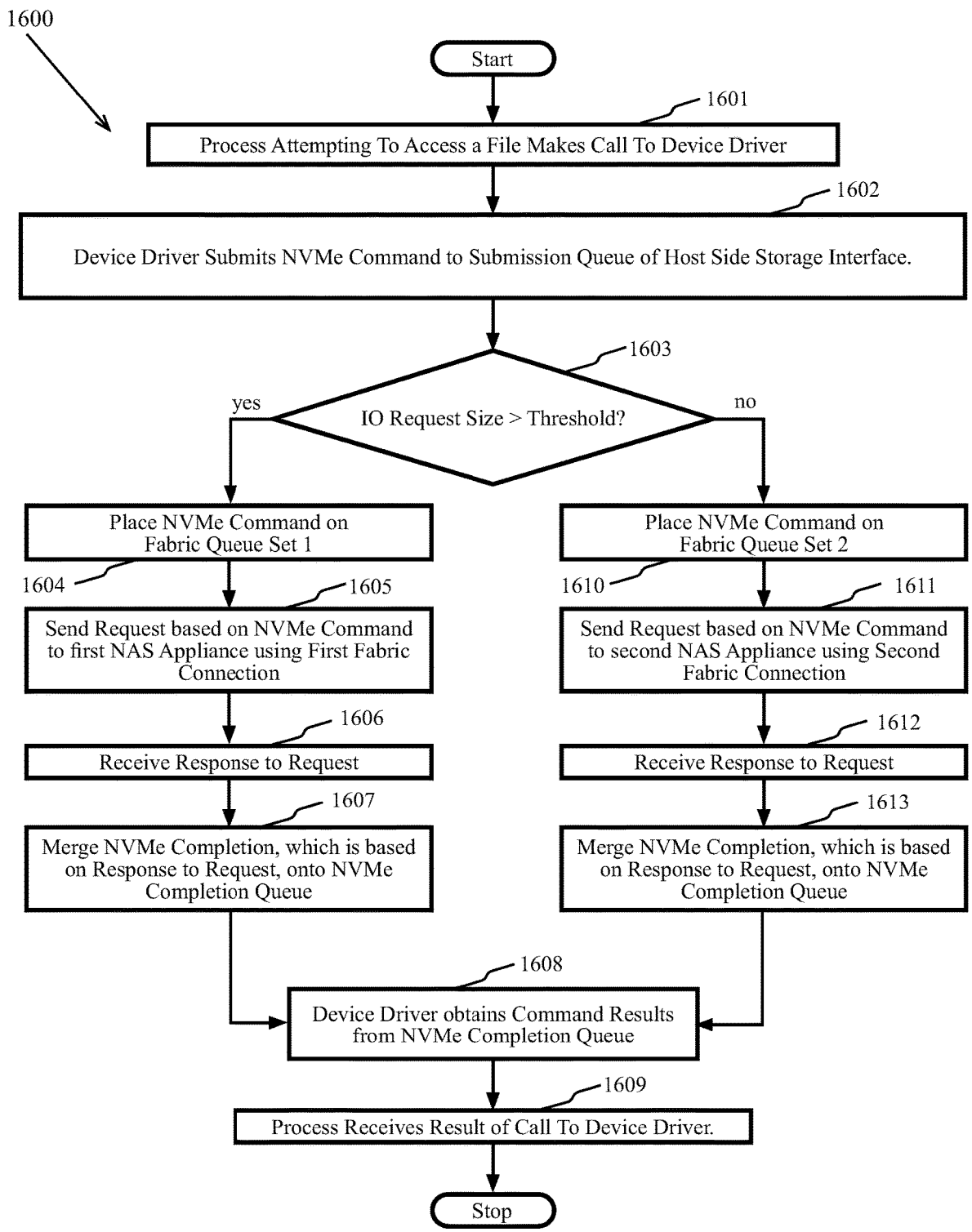
FIG. 16 is a high-level flow diagram of NVMe transactions being sent to different NAS appliances based on a fairness policy according to some aspects.

FIG. 16 is a high-level flow diagram of NVMe transactions being sent to different NAS appliances based on a fairness policy according to some aspects. After the start, at block 1601 a process attempting to access a file makes a call to a device driver. At block 1602 the device driver submits a NVMe command to a submission queue of the host side storage interface (e.g. NIC 1402). At block 1603, the IO request size is compared to a threshold value (e.g. IO request size>threshold?). If the IO request size is greater than the threshold, the process branches to block 1604, otherwise the process branches to block 1610. The branches merge at block 1608. At block 1604 the NVMe command is placed on fabric queue set 1. At block 1605 a request based on the NVMe command is sent to a first NAS appliance using a first fabric connection. As discussed above, the NVMe command can be translated into a request having whatever SAN protocol the first NAS appliance can use. At block 1606 a response to the request is received on fabric queue set 1. At block 1607 a NVMe Completion that is based on the response to the request is merged onto NVMe completion queue. At block 1608 the device driver obtains the command results from the NVMe completion queue. At block 1609 the process receives the result of the call to the device driver. At block 1610 the NVMe command is placed on fabric queue set 2. At block 1611 a request based on the NVMe command is sent to a second NAS appliance using a first fabric connection. As discussed above, the NVMe command can be translated into a request having whatever SAN protocol the second NAS appliance can use. At block 1612 a response to the request is received on fabric queue set 2. At block 1613 a NVMe Completion that is based on the response to the request is merged onto NVMe completion queue.

Figure 17:
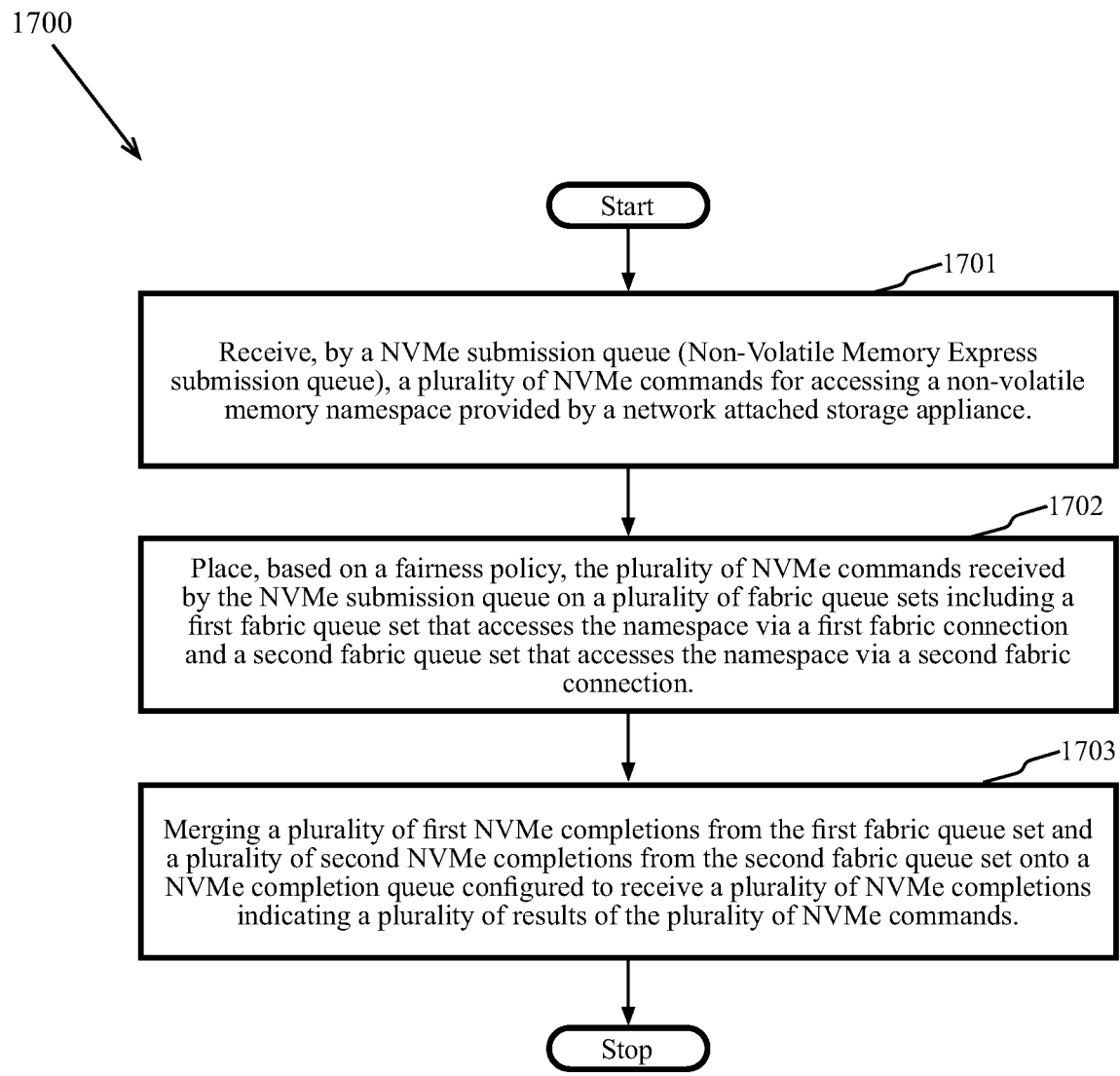
FIG. 17 is a high-level flow diagram of a method for increasing fairness for small vs large NVMe IO commands according to some aspects.

FIG. 17 is a high-level flow diagram of a method for increasing fairness for small vs large NVMe IO commands according to some aspects. After the start, at block 1701 the method receives, by a NVMe submission queue (Non-Volatile Memory Express submission queue), a plurality of NVMe commands for accessing a non-volatile memory namespace provided by a network attached storage appliance. At block 1702, the method places, based on a fairness policy, the plurality of NVMe commands received by the NVMe submission queue on a plurality of fabric queue sets including a first fabric queue set that accesses the namespace via a first fabric connection and a second fabric queue set that accesses the namespace via a second fabric connection. At block 1703, the method merges a plurality of first NVMe completions from the first fabric queue set and a plurality of second NVMe completions from the second fabric queue set onto a NVMe completion queue configured to receive a plurality of NVMe completions indicating a plurality of results of the plurality of NVMe commands.

Aspects described above can be ultimately implemented in a network appliance that includes physical circuits that implement digital data processing, storage, and communications. The network appliance can include processing circuits, ROM, RAM, CAM, and at least one interface (interface(s)). In an embodiment, the CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). In an embodiment, the network appliance may be embodied as a single IC device (e.g., fabricated on a single substrate) or the network appliance may be embodied as a system that includes multiple IC devices connected by, for example, a printed circuit board (PCB). In an embodiment, the interfaces may include network interfaces (e.g., Ethernet interfaces and/or InfiniB and interfaces) and/or PCI Express (PCIe) interfaces. The interfaces may also include other management and control interfaces such as I2C, general purpose I/Os, USB, UART, SPI, and eMMC.

As used herein the terms "packet" and "frame" may be used interchangeably to refer to a protocol data unit (PDU) that includes a header portion and a payload portion and that is communicated via a network protocol or protocols. In some embodiments, a PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method comprising:
    receiving, by a NVMe submission queue (Non-Volatile Memory Express submission queue), a plurality of NVMe commands for accessing a non-volatile memory namespace provided by a network attached storage appliance;
    placing the plurality of NVMe commands received by the NVMe submission queue on a plurality of fabric queue sets including a first fabric queue set that accesses the non-volatile memory namespace via a first fabric connection and a second fabric queue set that accesses the non-volatile memory namespace via a second fabric connection; and
    merging a plurality of first NVMe completions from the first fabric queue set and a plurality of second NVMe completions from the second fabric queue set onto a NVMe completion queue configured to receive a plurality of NVMe completions indicating a plurality of results of the plurality of NVMe commands.

2. The method of claim 1 wherein the first fabric queue set receives the plurality of NVMe commands that are below a size threshold and the second fabric queue set receives the plurality of NVMe commands that are above the size threshold.

3. The method of claim 1 wherein a host provides a NVMe interface that includes the NVMe submission queue and the NVMe completion queue.

4. The method of claim 1 wherein the first fabric connection connects to the network attached storage appliance and the second fabric connection connects to a second network attached storage appliance mirroring the non-volatile memory namespace.

5. The method of claim 1 wherein the first fabric connection is a first transmission control protocol (TCP) connection configured with a first quality of service, and the second fabric connection is a second TCP connection configured with a second quality of service different from the first quality of service.

6. The method of claim 1 wherein a host includes a SR-IOV (single root IO virtualization) capable NVMe card that provides a VF (virtual function) that includes the NVMe submission queue and the NVMe completion queue.

7. The method of claim 1 wherein the first fabric connection carries a plurality of NVMe/TCP PDUs to and from the network attached storage appliance.

8. The method of claim 1 wherein the first fabric connection carries a plurality of iSCSI packets to and from the network attached storage appliance.

9. The method of claim 1 wherein the first fabric connection carries a plurality of Infiniband payloads to and from the network attached storage appliance.

10. A host side storage interface comprising:
    a NVMe submission queue configured to receive a plurality of NVMe commands for accessing a non-volatile memory namespace provided by a network attached storage appliance;
    a NVMe completion queue configured to receive a plurality of NVMe completions indicating a plurality of results of the plurality of NVMe commands; and
    a plurality of fabric queue sets including a first fabric queue set that accesses the non-volatile memory namespace via a first fabric connection and a second fabric queue set that accesses the non-volatile memory namespace via a second fabric connection, wherein the host side storage interface is further configured to:
place the plurality of NVMe commands received by the NVMe submission queue on the plurality of fabric queue sets in accordance with a fairness policy, and
merge a plurality of first NVMe completions from the first fabric queue set and a plurality of second NVMe completions from the second fabric queue set onto the NVMe completion queue.

11. The host side storage interface of claim 10, a host provides a NVMe interface that includes the NVMe submission queue and the NVMe completion queue.

12. The host side storage interface of claim 10, wherein the plurality of NVMe commands that are below a size threshold are diverted to the first fabric queue set and the plurality of NVMe commands that are above the size threshold are diverted to the second fabric queue set.

13. The host side storage interface of claim 10 wherein the first fabric connection connects to the network attached storage appliance and the second fabric connection connects to a second network attached storage appliance mirroring the non-volatile memory namespace.

14. The host side storage interface of claim 10 wherein the first fabric connection is a first TCP connection configured with a first quality of service, and the second fabric connection is a second TCP connection configured with a second quality of service different from the first quality of service.

15. The host side storage interface of claim 10 wherein the host side storage interface is a SR-IOV capable NVMe card providing a VF (virtual function) that includes the NVMe submission queue and the NVMe completion queue.

16. The host side storage interface of claim 10 wherein the first fabric connection carries a plurality of NVMe/TCP PDUs to and from the network attached storage appliance.

17. The host side storage interface of claim 10 wherein the first fabric connection carries a plurality of iSCSI packets to and from the network attached storage appliance.

18. The host side storage interface of claim 10 wherein the first fabric connection carries a plurality of Infiniband payloads to and from the network attached storage appliance.

19. A host side storage interface comprising a processor that includes:
a NVMe submission queue configured to receive a plurality of NVMe commands for accessing a non-volatile memory namespace provided by a means for providing remote storage;
a NVMe completion queue configured to receive a plurality of NVMe completions associated with the plurality of NVMe commands;
a means for diverting a first NVMe command from the NVMe submission queue to a means for accessing the non-volatile memory namespace via a first connection means;
a means for diverting a second NVMe command from the NVMe submission queue to a means for accessing the non-volatile memory namespace via a second connection means;
a means for receiving a means for indicating a result of a first command;
a means for receiving a means for indicating the result of a second command; and
a means for merging the means for indicating the result of the first command and the means for indicating the result of the second command onto the NVMe completion queue.

20. The host side storage interface of claim 19, the processor further comprising:
a means for selecting a portion of the plurality of NVMe commands for diversion to the means for accessing the non-volatile memory namespace via the first connection means; and
a means for selecting a second portion of the plurality of NVMe commands for diversion to the means for accessing the non-volatile memory namespace via the second connection means.

* * * * *